United States Patent
Zingg et al.

(10) Patent No.: US 6,881,773 B2
(45) Date of Patent: Apr. 19, 2005

(54) WEATHERABILITY OF FLAME RETARDANT POLYOLEFIN

(75) Inventors: Jürg Zingg, Reinach (CH); Jürgen Link, Mödling (AT)

(73) Assignee: Ciba Specialty Chemicals Corp., Tarrytown, NY (US)

( * ) Notice: Subject to any disclaimer, the term of this patent is extended or adjusted under 35 U.S.C. 154(b) by 270 days.

(21) Appl. No.: 10/013,630

(22) Filed: Dec. 10, 2001

(65) Prior Publication Data

US 2002/0120041 A1 Aug. 29, 2002

(30) Foreign Application Priority Data

Dec. 12, 2000 (EP) .............................................. 00811174

(51) Int. Cl.$^7$ ..................... C08K 5/3492; C08K 5/3495
(52) U.S. Cl. .................. 524/100; 524/99; 524/101; 524/102
(58) Field of Search .................. 524/99–102

(56) References Cited

U.S. PATENT DOCUMENTS

| | | | | |
|---|---|---|---|---|
| 4,966,931 A | | 10/1990 | Akitaya et al. ............. | 524/100 |
| 5,004,770 A | | 4/1991 | Cortolano et al. ............ | 524/99 |
| 5,096,950 A | | 3/1992 | Galbo et al. ................. | 524/99 |
| 5,204,473 A | | 4/1993 | Winter et al. ............... | 546/188 |
| 5,227,416 A | * | 7/1993 | Knox et al. ................. | 524/101 |
| 5,300,544 A | | 4/1994 | Galbo et al. ................. | 524/100 |
| 5,393,812 A | * | 2/1995 | Haley et al. ................. | 524/91 |
| 5,798,407 A | * | 8/1998 | Yano et al. .................. | 524/504 |
| 5,844,026 A | * | 12/1998 | Galbo et al. ................. | 524/100 |
| 5,912,301 A | * | 6/1999 | Tamai et al. .................. | 525/66 |
| 6,117,995 A | | 9/2000 | Zedda et al. ................. | 544/207 |
| 6,228,911 B1 | * | 5/2001 | Gilg ............................. | 524/91 |
| 6,265,475 B1 | * | 7/2001 | Chifei et al. ................ | 524/127 |
| 6,271,377 B1 | * | 8/2001 | Galbo et al. ................. | 546/14 |
| 6,309,987 B1 | | 10/2001 | Srinivasan ................... | 442/147 |
| 6,451,887 B1 | * | 9/2002 | Wood et al. ................. | 524/91 |
| 6,472,456 B1 | * | 10/2002 | Horsey et al. ................ | 524/99 |
| 6,489,383 B1 | * | 12/2002 | Wood et al. ................. | 524/91 |
| 2002/0010235 A1 | * | 1/2002 | Horsey et al. ................ | 524/99 |

FOREIGN PATENT DOCUMENTS

| | | |
|---|---|---|
| EP | 0366057 | 5/1990 |
| EP | 0665233 | 8/1995 |
| EP | 0792911 | 9/1997 |
| EP | 0889085 | 1/1999 |
| GB | 2225018 | 5/1990 |
| WO | 98/28361 | 7/1998 |
| WO | 99/00450 | 1/1999 |
| WO | 01/92392 | 12/2001 |
| WO | 01/92393 | 12/2001 |
| WO | 01/92398 | 12/2001 |

OTHER PUBLICATIONS

PAJ Abstract for JP 4146944 (1992).
D. Vega et al., Acta Cryst. (2000), C56, pp. 1009–1010.
Derwent Abstract 2000–507947 [46] for JP 2000169731 (2000).

* cited by examiner

*Primary Examiner*—Peter Szekely
(74) *Attorney, Agent, or Firm*—Tyler A. Stevenson

(57) ABSTRACT

Stabilized thermoplastic polymer, especially polyolefin compositions comprising a flame retardant selected from b1) melamin based flame retardants, or one of the compounds b2) bis-(hexachlorocyclopentadieno)cyclooctane, b3) tris-(2,3-dibromopropyl)-isocyanurate, b4) ethylene-bis-tetrabromophthalimide;

b5) 1,2,5,6,9,10-hexabromo-cyclo-dodecan, b6) ethane-1,2-bis(pentabromophenyl); and c) a sterically hindered amine light stabilizer of the hydrocarbyloxyamine or hydroxyhydrocarbyloxyamine class and optional further components combine optimum outdoor weathering stability and good flame retardant properties.

18 Claims, No Drawings

WEATHERABILITY OF FLAME RETARDANT POLYOLEFIN

The instant invention pertains to a thermoplastic organic polymer, especially a polyolefin such as thermoplastic polyolefin (TPO), stabilized against the deleterious effects of light, oxygen and heat and containing a certain flame retardant, which contains a sterically hindered amine of the hydrocarbyloxyamine or hydroxyhydrocarbyloxyamine class and optionally further stabilizers, to the use of these flame retardants and sterically hindered amines for imparting both light stabilization and flame retardant properties, and to a corresponding process for improving light stability and flame retardancy of a thermoplastic organic polymer.

U.S. Pat. No. 5,393,812 does describe polyolefin compositions which are made flame retardant by addition of a halogenated hydrocarbyl phosphate or phosphonate ester flame retardant, and stabilized against weathering with a alkoxyamine functional hindered amine. EP-A-792911 proposes the use of a alkoxyamine functional hindered amine for improving the flame retardant properties of a polyolefin. The activity of alkoxyamine functional hindered amines alone as a flame retardant is disclosed in WO 99/00450.

There is still need to improve flame retardant polymer compositions in order to obtain good stability against weathering.

Now it has been found that optimum stabilization against UV light and weathering and good flame retardant properties, especially for outdoor applications can be combined in a thermoplastic polymer, especially a polyolefin, polyolefin copolymer or blend thereof such as impact modified polyolefin or thermoplastic polyolefin (TPO), when certain hindered amine stabilizers are used in combination with a specific flame retardant. Thus, present invention pertains to the use of a combination of a flame retardant selected from b1) melamine based flame retardants and/or ammonium polyphosphate, b2) bis-(hexachlorocyclopentadieno) cyclooctane, b3) tris-(2,3-dibromopropyl)-isocyanurate, b4) ethylene-bis-tetrabromophthalimide, b5) 1,2,5,6,9,10-hexabromo-cyclo-dodecane, b6) 1,2-bis(pentabromophenyl)ethane; and (c) a sterically hindered amine light stabilizer of the hydrocarbyloxyamine or hydroxyhydrocarbyloxyamine class for imparting both weathering stability and flame retardancy to a thermoplastic polymer (a), provided that the flame retardant is not (b4) if the sterically hindered amine is of the hydroxyhydrocarbyloxy class.

DETAILED DISCLOSURE

The sterically hindered amine light stabilizer of the hydrocarbyloxyamine or hydroxyhydrocarbyloxyamine class of component (c) is characterized by its substituent $E_1$-O— on the amino nitrogen atom (see formula below), wherein $E_1$ is preferably $C_1$–$C_{18}$alkyl, $C_5$–$C_{12}$cycloalkyl or $C_7$–$C_{15}$aralkyl in the sterically hindered amine of the hydrocarbyloxyamine class; and $E_1$ is preferably $C_1$–$C_{18}$alkyl, $C_5$–$C_{12}$cycloalkyl or $C_7$–$C_{15}$aralkyl each of which is substituted in the aliphatic part by 1–3 OH groups in the sterically hindered amine of the hydroxyhydrocarbyloxyamine class. The latter type of compound, containing a reactive OH group, may also be used in the form of its reaction product.

The sterically hindered amine light stabilizer of the hydrocarbyloxyamine or hydroxyhydrocarbyloxyamine class of component c usually is a compound containing a group of the formula

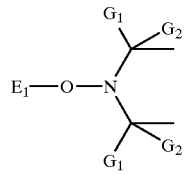

where $G_1$ and $G_2$ are independently alkyl of 1 to 4 carbon atoms or are together pentamethylene, and $E_1$ is $C_1$–$C_{18}$alkyl, $C_5$–$C_{12}$cycloalkyl or $C_7$–$C_{15}$aralkyl; or $E_1$ is $C_1$–$C_{18}$alkyl, $C_5$–$C_{12}$cycloalkyl or $C_7$–$C_{15}$aralkyl each of which is substituted in the aliphatic part by 1–3 OH groups; or is a reaction product thereof. Preferred is a cyclic sterically hindered amine conforming to the formula

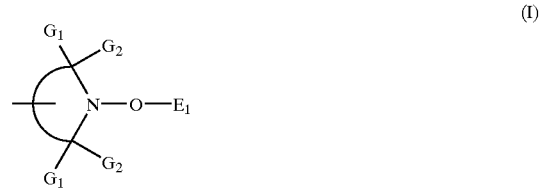

(I)

wherein $G_1$, $G_2$ and $E_1$ are as defined above;

T is a divalent organic radical required to complete formula I to form, together with the hindered amine nitrogen atom and the two quaternary carbon atoms substituted by $G_1$ and $G_2$, a five- or six-membered aliphatic ring structure, especially a piperidine ring;

or is an oligomeric or polymeric hindered amine molecule made from the reaction of a dialkyl ester or isocyanate with a compound of the formula (I) wherein $E_1$ contains 1 OH group and T is —$CH_2$—$CH(OH)$—$CH_2$—;

or is a simple diester or urethane derivative of a compound of the formula (I) wherein $E_1$ contains 1 OH group and T is —$CH_2$—$CH(OH)$—$CH_2$—.

In general, effective stabilizing amounts of a compound of component c used are from 0.01 to 10%, preferably from 0.05 to 5% by weight, especially from 0.1 to 2% by weight, based on the polymer component (a), of the stabilizer of component (c).

Sterically hindered amines of present component (c) are largely known as light stabilizers (U.S. Pat. Nos. 5,004,770; 5,096,950; 5,204,473; 5,096,950; 5,300,544; 6,117,995; 6,271,377).

Flame retardants of component (b) are commercial compounds. Most preferred is tris-(2,3-dibromopropyl)-isocyanurate (b3).

Halogen-free flame retardants b1 are usually employed in an amount from 1 to about 50% by weight of the polymer (a), preferably in an amount from 5 to 50% by weight of the polymer (a). The ratio b1:c is most preferably in the range from 20:1 to 250:1.

Halogenated flame retardants b2, b3, b4, b5 and/or b6 are usually employed in a total amount from 0.5 to 40% by weight of the polymer (a); more preferably 3 to 40%, most preferably 5 to 35% by weight of polymer (a).

Most preferred amounts of flame retardants (b) in the compositions of present invention are for b1) the melamine based flame retardant and/or ammonium polyphosphate 20–50%;
b2) bis-(hexachlorocyclopentadieno) cyclooctane 5–20%;
b3) tris-(2,3-dibromopropyl)-isocyanurate 2–10%;
b4) ethylene-bis-tetrabromophthalimide 10–40%;
b5) 1,2,5,6,9,10-hexabromo-cyclo-dodecane 2–20%;
b6) 1,2-bis(pentabromophenyl)ethane 2–20%;

each amount denotes percent by weight, based on the weight of the polymer (a).

Also of importance in the context of present invention is the use of the flame retardant tris(3-bromo-2,2-(bromomethyl)propyl) phosphate (b7; see below), which is most preferably employed in an amount of 2–20, especially 2–10, percent by weight, based on the weight of the polymer (a).

The ratio of halogenated flame retardants b2, b3, b4, b5, b6 or b7:c is most preferably in the range from 5:1 to 100:1.

Advantageously, halogenated flame retardants such as b2, b3, b4, b5, b6 and/or b7 may be used in combination with an appropriate synergist such as an antimon compound (often $Sb_2O_3$), which is commonly added in an amount of 0.5 to 20% by weight of the polymer (a).

Component a is frequently selected from the following thermoplastic polymers:

1. Polymers of monoolefins and diolefins, for example polypropylene (PP), polyisobutylene, polybut-1-ene, poly-4-methylpent-1-ene, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE).

Polyolefins, i.e. the polymers of monoolefins exemplified in the preceding paragraph, preferably polyethylene and polypropylene, can be prepared by different, and especially by the following, methods:
  a) radical polymerisation (normally under high pressure and at elevated temperature).
  b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and their copolymers with carbon monoxide or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylenel-carbon monoxide copolymers and mixtures thereof with other polymers, for example polyamides.

4. Blends of the aforementioned polymers (polyblends), for example PP/EPDM.

In the following, the term polyolefin will be used for pure polyolefin homopolymers as well as copolymers and blends thereof.

Preferably, the polyolefin or thermoplastic olefin or polyolefin (TPO) is the only organic polymer present in these compositions; mainly it is polyethylene (PE) or polypropylene (PP), especially LDPE, LLDPE or PP, or copolymers of PP and PE.

Especially preferred as component (a) are polymers known as thermoplastic (poly)olefines (TPO), e.g. polypropylene or polyethylene containing an impact modifyer or elastomer component such as EPR etc., or heterophasic copolymers (see e.g. W. Neissl et al., Kunststoffe 83, No. 8, 1993).

Examples of polymer compositions in which the instant compounds are effective include flame retardant polyolefins where acidic residues from the decomposition of the halogenated flame retardants deactivate hindered amines not having the N—OR group, roofing membranes, greenhouse films and agricultural mulch films where acidic residues from pesticides interfere with the activity of "normal" hindered amine stabilizers, and in thermoplastic polyolefins where pigment interactions with basic hindered amine stabilizers interfere with painting the substrate surfaces.

Preferably, the compound of, present component c is a cyclic sterically hindered amine containing a group of formula (II) and/or (III)

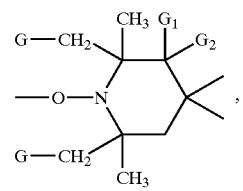

(II)

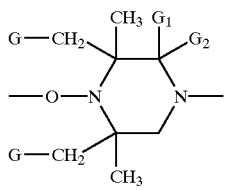

(III)

in which G is hydrogen or methyl, and $G_1$ and $G_2$, independently of one another, are hydrogen, methyl or together are a substituent =O.

Examples of sterically hindered amines of present component c are described below under classes (a') to (m').

(a') A Compound of the Formula (1a)

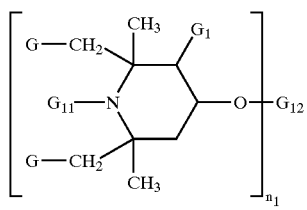

(1a)

in which $n_1$ is a number from 1 to 4, G and $G_1$, independently of one another, are hydrogen or methyl, $G_{11}$ is O, hydroxyl, $C_1$–$C_{18}$alkoxy, $C_5$–$C_{12}$cycloalkoxy, $C_7$–$C_{15}$phenylalkoxy; or $G_{11}$ is $C_1$–$C_{18}$alkoxy, $C_5$–$C_{12}$cycloalkoxy or $C_7$–$C_{15}$phenylalkoxy each of which is substituted in the aliphatic part by 1–3 OH groups; $G_{11}$ preferably being $C_1$–$C_{12}$alkoxy or cyclohexyloxy or $C_2$–$C_8$hydroxyalkoxy, especially octyloxy, cyclohexyloxy or 2-hydroxy-2-methylpropoxy, and $G_{12}$, if $n_1$ is 1, is hydrogen, $C_1$–$C_{18}$alkyl which is uninterrupted or interrupted by one or more oxygen atoms, COO and/or CONH groups, or is cyanoethyl, benzoyl, glycidyl, a monovalent radical of an aliphatic, cycloaliphatic, araliphatic, unsaturated or aromatic carboxylic acid, carbamic acid or phosphorus-containing acid or a monovalent silyl radical, preferably a radical of an aliphatic carboxylic acid having 2 to 18 carbon atoms, of a cycloaliphatic carboxylic acid having 7 to 15 carbon atoms, or an α,β-unsaturated carboxylic acid having 3 to 5 carbon atoms or of an aromatic carboxylic acid having 7 to 15 carbon atoms, where each carboxylic acid can be substituted in the aliphatic, cycloaliphatic or aromatic moiety by 1 to 3 —$COOZ_{12}$ groups, in which $Z_{12}$ is H, $C_1$–$C_{20}$alkyl, $C_3$–$C_{12}$alkenyl, $C_5$–$C_7$cycloalkyl, phenyl or benzyl, $G_{12}$, if $n_1$ is 2, is $C_2$–$C_{12}$alkylene, $C_4$–$C_{12}$alkenylene, xylylene, a divalent radical of an aliphatic, cycloaliphatic, araliphatic or aromatic dicarboxylic acid, dicarbamic acid or phosphorus-containing acid or a divalent silyl radical, preferably a radical of an aliphatic dicarboxylic acid having 2 to 36 carbon atoms, or a cycloaliphatic or aromatic dicarboxylic acid having 8–14 carbon atoms or of an aliphatic, cycloaliphatic or aromatic dicarbamic acid having 8–14 carbon atoms, where each dicarboxylic acid may be substituted in the aliphatic, cycloaliphatic or aromatic moiety by one or two —$COOZ_{12}$ groups, $G_{12}$, if $n_1$ is 3, is a trivalent radical of an aliphatic, cycloaliphatic or aromatic tricarboxylic acid, which may be substituted in the aliphatic, cycloaliphatic or aromatic moiety by —$COOZ_{12}$, of an aromatic tricarbamic acid or of a phosphorus-containing acid, or is a trivalent silyl radical, preferred radicals including triacyl radicals of nitrilo triacetic acid of benzene tricarboxylic acid, and $G_{12}$, if $n_1$ is 4, is a tetravalent radical of an aliphatic, cycloaliphatic or aromatic tetracarboxylic acid.

The carboxylic acid radicals mentioned above are in each case taken to mean radicals of the formula (—CO)$_x$R, where x is as defined above for $n_1$, and the meaning of R arises from the definition given above.

Alkyl with up to 20 carbon atoms is, for example, methyl, ethyl, n-propyl, n-butyl, sec-butyl, tert-butyl, n-hexyl, n-octyl, 2-ethylhexyl, n-nonyl, n-decyl, n-undecyl, n-dodecyl, n-tridecyl, n-tetradecyl, n-hexadecyl or n-octadecyl.

$C_1$–$C_{18}$alkoxy $G_{11}$ is, for example, methoxy, ethoxy, propoxy, isopropoxy, butoxy, isobutoxy, pentoxy, isopentoxy, hexoxy, heptoxy, octoxy, decyloxy, dodecyloxy, tetradecyloxy, hexadecyloxy and octadecyloxy. $C_6$–$C_{12}$alkoxy, in particular heptoxy and octoxy, is preferred.

$C_5$–$C_{12}$cycloalkoxy $G_{11}$ is, for example, cyclopentoxy, cyclohexoxy, cycloheptoxy, cyclooctoxy, cyclodecyloxy and cyclododecyloxy. $C_5$–$C_8$cycloalkoxy, in particular cyclopentoxy and cyclohexoxy, is preferred.

$C_7$–$C_9$phenylalkoxy is, for example, benzyloxy.

$G_{11}$ as $C_1$–$C_{18}$alkoxy, $C_5$–$C_{12}$cycloalkoxy or $C_7$–$C_{15}$phenylalkoxy substituted in the aliphatic part by 1–3 OH groups is a radical formed by abstraction of an carbon-bonded hydrogen atom preferably from 2-methyl-2-propanol (tert.-butanol), 2-propanol, 2,2-dimethyl-1-propanol, 2-methyl-2-butanol, ethanol, 1-propanol, 1-butanol, 1-pentanol, 1-hexanol, 1-nonanol, 1-decanol, 1-dodecanol, 1-octadecanol, 2-butanol, 2-pentanol, 2-ethyl-1-hexanol, cyclohexanol, cyclooctanol, allyl alcohol, phenethyl alcohol or 1-phenyl-1-ethanol; 1,2-ethanediol, 1,2-propanedial, 1,3-propanediol, 1,2-butanediol, 1,3-butanediol, 1,4-butanediol, 2,2-dimethyl-1,3-propanediol, 1,2-cyclohexanediol, 1,3-cyclohexanediol or 1,4-cyclohexanediol; glycerol, 1,1,1-tris(hydroxymethyl) methane, 2-ethyl-2-(hydroxymethyl-1,3-propanediol, 1,2,4-butanetriol or 1,2,6-hexanetriol.

More preferably, $G_{11}$ is are formed from 2-methyl-2-propanol or cyclohexanol, 1,4-butanediol, 2,2-dimethyl-1,3-propanediol, 1,2-cyclohexanediol, 1,3-cyclohexanediol or 1,4-cyclohexanediol. Most preferred hydroxy substituted $G_{11}$ is 2-hydroxy-2-methylpropoxy.

Examples of several $G_{12}$ radicals are given below.

If $G_{12}$ is a monovalent radical of a carboxylic acid, it is, for example, an acetyl, caproyl, stearoyl, acryloyl, methacryloyl, benzoyl or β-(3,5-di-tert-butyl-4-hydroxyphenyl)propionyl radical.

If $G_{12}$ is a monovalent silyl radical, it is, for example, a radical of the formula —(C$_j$H$_{2j}$)—Si(Z')$_2$Z", in which j is an integer in the range from 2 to 5, and Z' and Z", independently of one another, are $C_1$–$C_4$alkyl or $C_1$–$C_4$alkoxy.

If $G_{12}$ is a divalent radical of a dicarboxylic acid, it is, for example, a malonyl, succinyl, glutaryl, adipoyl, suberoyl, sebacoyl, maleoyl, itaconyl, phthaloyl, dibutylmalonyl, dibenzylmalonyl, butyl(3,5-di-tert-butyl-4-hydroxybenzyl) malonyl or bicycloheptenedicarbonyl radical or a group of the formula

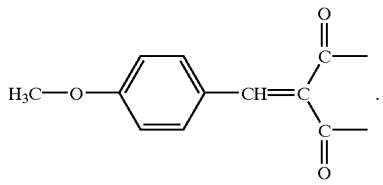

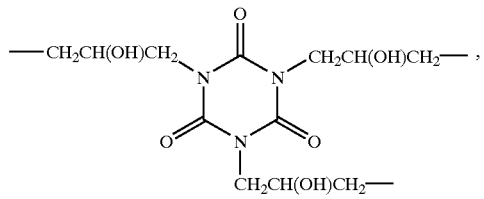

If $G_{12}$ is a trivalent radical of a tricarboxylic acid, it is, for example, a trimellitoyl, citryl or nitrilotriacetyl radical.

If $G_{12}$ is a tetravalent radical of a tetracarboxylic acid, it is, for example, the tetravalent radical of butane-1,2,3,4-tetracarboxylic acid or of pyromellitic acid.

If $G_{12}$ is a divalent radical of a dicarbamic acid, it is, for example, hexamethylenedicarbamoyl or 2,4-toluylenedicarbamoyl radical.

Preference is given to compounds of the formula (1a) in which G and $G_1$ are hydrogen, $G_{11}$ is hydrogen or methyl, $n_1$ is 2 and $G_{12}$ is the diacyl radical of an aliphatic dicarboxylic acid having 4–12 carbon atoms.

(b') A Compound of the Formula (1b)

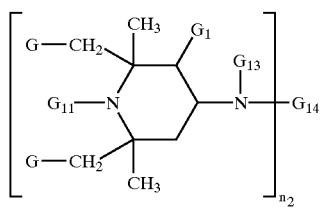

(1b)

in which $n_2$ is the number 1, 2 or 3, and G, $G_1$ and $G_{11}$ are as defined under (a'), $G_{13}$ is hydrogen, $C_1$–$C_{12}$alkyl, $C_2$–$C_5$hydroxyalkyl, $C_5$–$C_7$cycloalkyl, $C_7$–$C_8$aralkyl, $C_1$–$C_{18}$alkanoyl, $C_3$–$C_5$alkenoyl, benzoyl or a group of the formula

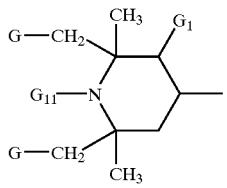

and $G_{14}$, if $n_2$ is 1, is hydrogen, $C_1$–$C_{18}$alkyl, $C_3$–$C_8$alkenyl, $C_5$–$C_7$cycloalkyl, $C_1$–$C_4$alkyl which is substituted by a hydroxyl, cyano, alkoxycarbonyl or carbamide group or group of the formula —CONH-Z, or $G_{14}$ is glycidyl, a group of the formula —$CH_2$—CH(OH)-Z or of the formula —CONH-Z, in which Z is hydrogen, methyl or phenyl or $CH_2$—$OZ_{14}$ with $Z_{14}$ being hydrogen or $C_1$–$C_{18}$alkyl;

$G_{14}$, if $n_2$ is 2, is $C_2$–$C_{12}$alkylene, $C_6$–$C_{12}$arylene, xylylene, a —$CH_2$—CH(OH)—$CH_2$ group or a —$CH_2$—CH(OH)—$CH_2$—O-D-O— group, in which D is $C_2$–$C_{10}$alkylene, $C_6$–$C_{15}$arylene, $C_6$–$C_{12}$cycloalkylene, or, provided that $G_{13}$ is not alkanoyl, alkenoyl or benzoyl, $G_{14}$ can alternatively be 1-oxo-$C_2$–$C_{12}$alkylene, a divalent radical of an aliphatic, cycloaliphatic or aromatic dicarboxylic acid or dicarbamic acid or alternatively the group —CO—, $G_{14}$, if $n_2$ is 3, is a group or, if $n_2$ is 1, $G_{13}$ and $G_{14}$ together can be the divalent radical of an aliphatic, cycloaliphatic or aromatic 1,2- or 1,3-dicarboxylic acid.

Some examples for the radicals $G_{13}$, $G_{14}$ and D are given below.

Any alkyl substituents are as defined above for (a').

Any $C_5$–$C_7$cycloalkyl substituents are, in particular, cyclohexyl.

$C_7$–$C_8$aralkyl $G_{13}$ is, in particular, phenylethyl or especially benzyl.

$C_2$–$C_5$hydroxyalkyl $G_{13}$ is, in particular, 2-hydroxyethyl or 2-hydroxypropyl.

$C_1$–$C_{18}$alkanoyl $G_{13}$ is, for example, formyl, acetyl, propionyl, butyryl, octanoyl, dodecanoyl, hexadecanoyl, octadecanoyl, but preferably acetyl, and $C_3$–$C_5$alkenoyl $G_{13}$ is, in particular, acryloyl.

$C_2$–$C_8$alkenyl $G_{14}$ is, for example, allyl, methallyl, 2-butenyl, 2-pentenyl, 2-hexenyl or 2-octenyl.

$G_{14}$ as a hydroxyl-, cyano-, alkoxycarbonyl- or carbamide-substituted $C_1$–$C_4$alkyl can be, for example, 2-hydroxyethyl, 2-hydroxypropyl, 2-cyanoethyl, methoxycarbonylmethyl, 2-ethoxycarbonylethyl, 2-aminocarbonylpropyl or 2-(dimethylaminocarbonyl)ethyl.

Any $C_2$–$C_{12}$alkylene radicals are, for example, ethylene, propylene, 2,2-dimethylpropylene, tetramethylene, hexamethylene, octamethylene, decamethylene or dodecamethylene.

Any $C_6$–$C_{15}$arylene substituents are, for example, o-, m- or p-phenylene, 1,4-naphthylene or 4,4'-diphenylene.

$C_6$–$C_{12}$cycloalkylene is, in particular, cyclohexylene.

$G_{14}$ as 1-oxo-$C_2$–$C_{12}$alkylene is preferably a group

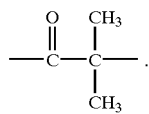

(c') A Compound of the Formula (1c)

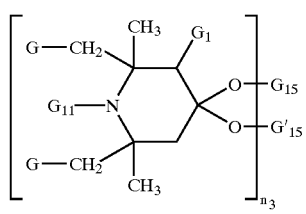

(1c)

in which $n_3$ is the number 1 or 2, G, $G_1$ and $G_{11}$ are as defined under (a'), and $G_{15}$ and $G'_{15}$ if $n_3$ is 1, are independently $C_1$–$C_{12}$ alkyl, $C_2$–$C_{12}$ alkenyl, $C_7$–$C_{12}$ aralkyl, or $G_{15}$ is also hydrogen, or $G_{15}$ and $G'_{15}$ together are $C_2$–$C_8$alkylene, $C_5$–$C_{15}$alkenylene, $C_2$–$C_8$hydroxyalkylene or $C_4$–$C_{22}$acyloxyalkylene, and if $n_3$ is 2, $G_{15}$ and $G'_{15}$ together are the (—$CH_2$)$_2$C($CH_2$—)$_2$ group $C_2$–$C_8$alkylene or $C_2$–$C_8$hydroxyalkylene $G_5$ and $G'_{15}$ is, for example, ethylene, 1-methylethylene, propylene, 2-ethylpropylene or 2-ethyl-2-hydroxymethylpropylene.

$C_4$–$C_{22}$acyloxyalkylene $G_{15}$ and $G'_{15}$ is, for example, 2-ethyl-2-acetoxymethylpropylene.

(d') A Compound of the Formula (1d-1), (1d-2) or (1d-3)

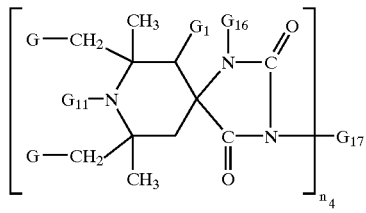

(1d-1)

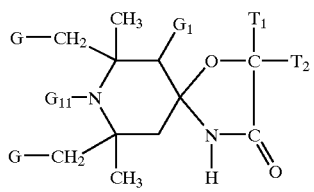

(1d-2)

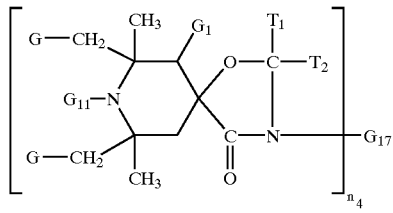

(1d-3)

in which $n_4$ is the number 1 or 2, G, $G_1$ and $G_{11}$ are as defined under (a'), $G_{16}$ is hydrogen, $C_1$–$C_{12}$alkyl, allyl, benzyl, glycidyl or $C_2$–$C_6$alkoxyalkyl, and $G_{17}$, if $n_4$ is 1, is hydrogen, $C_1$–$C_{12}$alkyl, $C_3$–$C_5$alkenyl, $C_7$–$C_9$aralkyl, $C_5$–$C_7$cycloalkyl, $C_2$–$C_4$hydroxyalkyl, $C_2$–$C_6$alkoxyalkyl, $C_6$–$C_{10}$aryl, glycidyl or a group of the formula —$(CH_2)_p$—COO-Q or —$(CH_2)_p$—O—CO-Q, in which p is 1 or 2, and Q is $C_1$–$C_4$alkyl or phenyl, and $G_{17}$, if $n_4$ is 2, is $C_2$–$C_{12}$alkylene, $C_4$–$C_{12}$alkenylene, $C_6$–$C_{12}$arylene, a group of the formula —$CH_2$—$CH(OH)$—$CH_2$—O-D'-O—$CH_2$—$CH(OH)$—$CH_2$—, in which D' is $C_2$–$C_{10}$alkylene, $C_6$–$C_{15}$arylene or $C_6$–$C_{12}$cycloalkylene, or a group of the formula —$CH_2CH(OD'')CH_2$—$(OCH_2$—$CH(OD'')$ $CH_2)_2$—, in which D" is hydrogen, $C_1$–$C_{18}$alkyl, allyl, benzyl, $C_2$–$C_{12}$alkanoyl or benzoyl, $T_1$ and $T_2$, independently of one another, are hydrogen, $C_1$–$C_{18}$alkyl or unsubstituted or halogen- or $C_1$–$C_4$alkyl-substituted $C_6$–$C_{10}$aryl or $C_7$–$C_9$aralkyl, or $T_1$ and $T_2$ together with the carbon atom bonding them form a $C_5$–$C_{14}$cycloalkane ring.

Any $C_1$–$C_{12}$alkyl substituents are, for example, methyl, ethyl, n-propyl, n-butyl, sec-butyl, tert-butyl, n-hexyl, n-octyl, 2-ethylhexyl, n-nonyl, n-decyl, n-undecyl or n-dodecyl.

Any $C_1$–$C_{18}$alkyl substituents can be, for example, the abovementioned groups and in addition, for example, n-tridecyl, n-tetradecyl, n-hexadecyl or n-octadecyl.

Any $C_2$–$C_6$alkoxyalkyl substituents are, for example, methoxymethyl, ethoxymethyl, propoxymethyl, tert-butoxymethyl, ethoxyethyl, ethoxypropyl, n-butoxyethyl, tert-butoxyethyl, isopropoxyethyl or propoxypropyl.

$C_3$–$C_5$alkenyl $G_{17}$ is, for example, 1-propenyl, allyl, methallyl, 2-butenyl or 2-pentenyl.

$C_7$–$C_9$aralkyl $G_{17}$, $T_1$ and $T_2$ are, in particular, phenethyl or especially benzyl. If $T_1$ and $T_2$ together with the carbon atom form a cycloalkane ring, this can be, for example, a cyclopentane, cyclohexane, cyclooctane or cyclododecane ring.

$C_2$–$C_4$hydroxyalkyl $G_{17}$ is, for example, 2-hydroxyethyl, 2-hydroxypropyl, 2-hydroxybutyl or 4-hydroxybutyl.

$C_6$–$C_{10}$aryl $G_{17}$, $T_1$ and $T_2$ are, in particular, phenyl or α- or β-naphthyl, which are unsubstituted or substituted by halogen or $C_1$–$C_4$alkyl.

$C_2$–$C_{12}$alkylene $G_{17}$ is, for example, ethylene, propylene, 2,2-dimethylpropylene, tetramethylene, hexamethylene, octamethylene, decamethylene or dodecamethylene.

$C_4$–$C_{12}$alkenylene $G_{17}$ is, in particular, 2-butenylene, 2-pentenylene or 3-hexenylene.

$C_6$–$C_{12}$arylene $G_{17}$ is, for example, o-, m- or p-phenylene, 1,4-naphthylene or 4,4'-diphenylene.

$C_2$–$C_{12}$alkanoyl D" is, for example, propionyl, butyryl, octanoyl, dodecanoyl, but preferably acetyl.

$C_2$–$C_{10}$alkylene, $C_6$–$C_{15}$arylene or $C_6$–$C_{12}$cycloalkylene D' have, for example, one of the definitions given for D under (b').

(e') A compound of the Formula (1e)

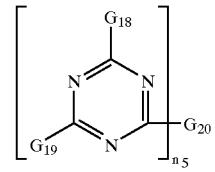

(1e)

in which $n_5$ is the number 1 or 2, and $G_{18}$ is a group of the formula

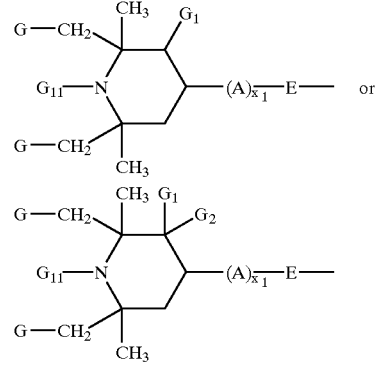

in which G and $G_{11}$ are as defined under (a'), and $G_1$ and $G_2$ are hydrogen, methyl or, together, are a substituent =O, E is —O— or —ND'''—, A is $C_2$–$C_6$alkylene or —$(CH_2)_3$—O— and $x_1$ is the number 0 or 1, D''' is hydrogen, $C_1$–$C_{12}$alkyl, $C_2$–$C_{12}$alkylene-$N(D^V)_2$, $C_2$–$C_5$hydroxyalkyl or $C_5$–$C_7$cycloalkyl where $D^V$, independently, is hydrogen or butyl, $G_{19}$ is identical to $G_{18}$ or is one of the groups —$N(G_{21})$ $(G_{22})$, —$OG_{23}$, —$N(H)(CH_2OG_{23})$ or —$N(CH_2OG_{23})_2$, $G_{20}$, if $n_5=1$, is identical to $G_{18}$ or $G_{19}$ and, if $n_5=2$, is an -E-$D^{IV}$-E- group, in which $D^{IV}$ is $C_2$–$C_8$alkylene or $C_2$–$C_8$alkylene which is interrupted by 1 or 2 —$NG_{21}$- groups, $G_{21}$ is hydrogen, $C_1$–$C_{12}$alkyl, cyclohexyl, benzyl or $C_1$–$C_4$-hydroxyalkyl or a group of the formula

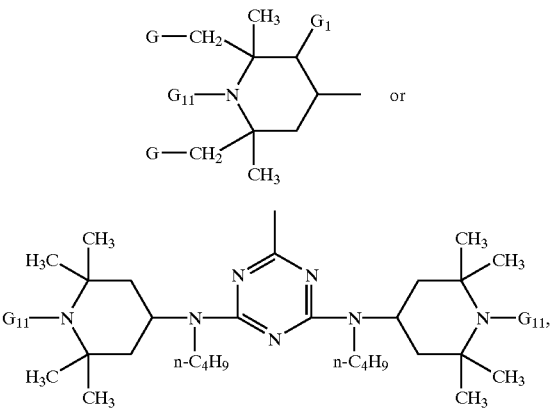

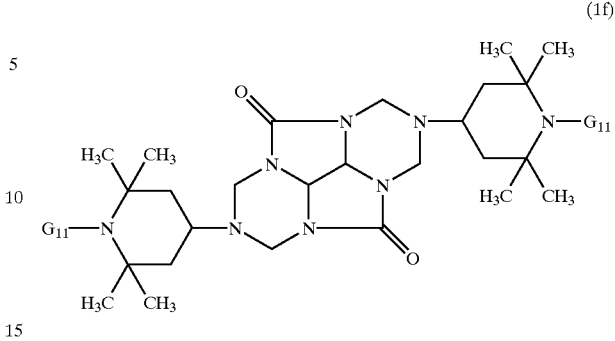

$G_{22}$ is $C_1$–$C_{12}$alkyl, cyclohexyl, benzyl or $C_1$–$C_4$hydroxyalkyl, and $G_{23}$ is hydrogen, $C_1$–$C_{12}$alkyl or phenyl, or $G_{21}$ and $G_{22}$ together are $C_4$–$C_5$alkylene or $C_4$–$C_5$oxaalkylene, for example —$CH_2CH_2$—O—$CH_2CH_2$—, or a group of the formula —$CH_2CH_2$—N($G_{11}$)-$CH_2CH_2$—.

Some examples of the several variables in the formula (Ie) are given below.

(f') A Compound of the Formula (1f)

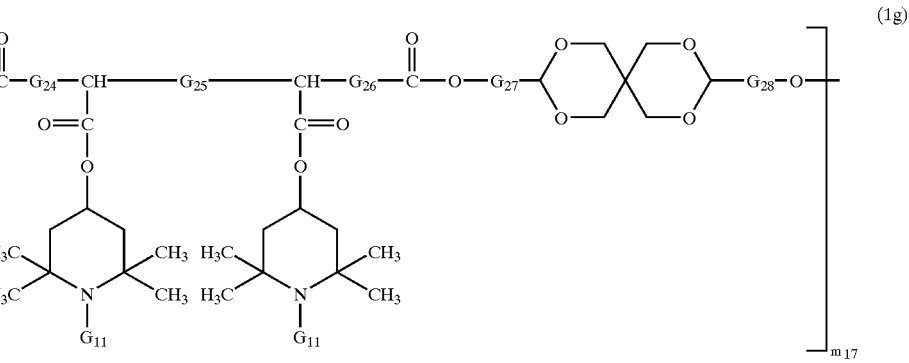

wherein $G_{11}$ is as defined under (a').

(g') Oligomeric or polymeric compounds whose recurring structural unit contains a 2,2,6,6-tetraalkylpiperidinyl radical, in particular polyesters, polyethers, polyamides, polyamines, polyurethanes, polyureas, polyaminotriazines, poly(meth)acrylates, poly(meth)acrylamides and copolymers thereof which contain such radicals.

Examples of 2,2,6,6-polyalkylpiperidine compounds from this class are the compounds of the following formulae. $m_1$ to $m_{14}$ is a number from 2 to about 200, preferably 2 to 100, for example 2 to 50, 2 to 40, 3 to 40 or 4 to 10.

The meanings of the end groups which saturate the free valences in the oligomeric or polymeric compounds listed below depend on the processes used for the preparation of said compounds. The end groups can also in addition be modified after the synthesis of the compounds.

Examples for polymeric compounds are:
1) A Compound of the Formula (1g)

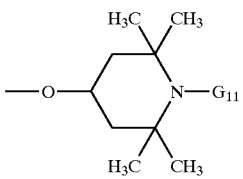

Any $C_1$–$C_{12}$alkyl substituents are, for example, methyl, ethyl, n-propyl, n-butyl, sec-butyl, tert-butyl, n-hexyl, n-octyl, 2-ethylhexyl, n-nonyl, n-decyl, n-undecyl or n-dodecyl.

Any hydroxyalkyl substituents are, for example, 2-hydroxyethyl, 2-hydroxypropyl, 3-hydroxypropyl, 2-hydroxybutyl or 4-hydroxybutyl.

Any $C_5$–$C_7$cycloalkyl substituents are, for example, cyclopentyl, cyclohexyl or cycloheptyl. Cyclohexyl is preferred.

$C_2$–$C_6$alkylene A is, for example, ethylene, propylene, 2,2-dimethylpropylene, tetramethylene or hexamethylene.

If $G_{21}$, and $G_{22}$ together are $C_4$–$C_5$alkylene or oxaalkylene, they are, for example, tetramethylene, pentamethylene or 3-oxapentamethylene.

wherein $G_{24}$, $G_{25}$, $G_{26}$, $G_{27}$ and $G_{28}$, independently of one another, are a direct bond or $C_1$–$C_{10}$alkylene, $G_{11}$ is as defined under (a') and $m_{17}$ is a number from 1 to 50.

In the compound of the formula (1g), the end group bonded to the >C=O group can be, for example, and the end group bonded to the oxygen can be, for example

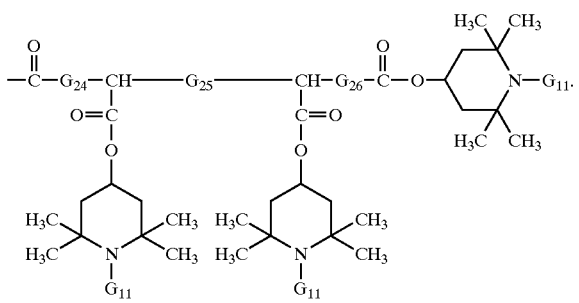

2) Compound of the Formula (2g)

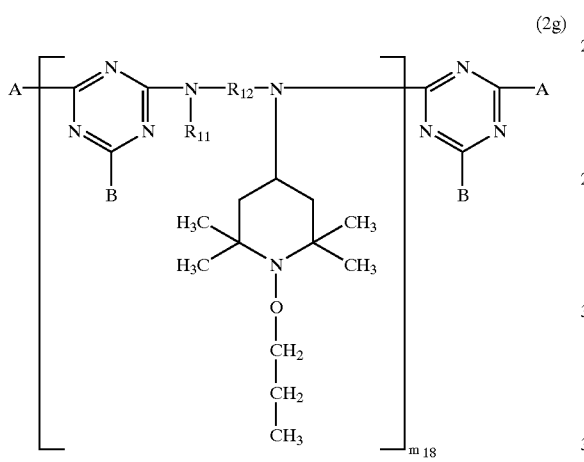

in which the index $m_{18}$ ranges from 1 to 15;
$R_{12}$ is $C_2$–$C_{12}$alkylene, $C_4$–$C_{12}$alkenylene, $C_5$–$C_7$cycloalkylene, $C_5$–$C_7$cycloalkylene-di($C_1$–$C_4$alkylene), $C_1$–$C_4$alkylenedi($C_5$–$C_7$cycloalkylene), phenylenedi($C_1$–$C_4$alkylene) or $C_4$–$C_{12}$alkylene interrupted by 1,4-piperazinediyl, —O— or >N—$X_1$ with $X_1$ being $C_1$–$C_{12}$acyl or ($C_1$–$C_{12}$alkoxy)carbonyl or having one of the definitions of $R_{14}$ given below except hydrogen; or $R_{12}$ is a group of the formula (2g') or (2g");

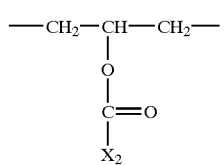

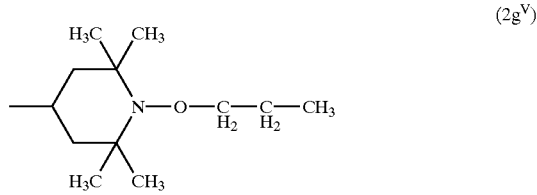

$X_2$ being $C_1$–$C_{18}$alkyl, $C_5$–$C_{12}$cycloalkyl which is unsubstituted or substituted by 1, 2 or 3 $C_1$–$C_4$alkyl; phenyl which is unsubstituted or substituted by 1, 2 or 3 $C_1$–$C_4$alkyl or $C_1$–$C_4$alkoxy; $C_7$–$C_9$phenylalkyl which is unsubstituted or substituted on the phenyl by 1, 2 or 3 $C_1$–$C_4$alkyl; and the radicals $X_3$ being independently of one another $C_2$–$C_{12}$alkylene;

the radicals A are independently of one another —$OR_{13}$, —$N(R_{14})(R_{15})$ or a group of the formula (2g''');

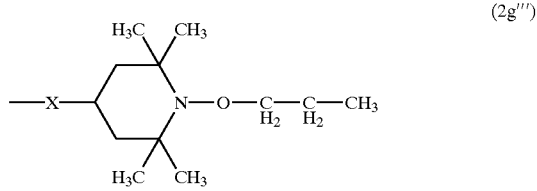

$R_{13}$, $R_{14}$ and $R_{15}$, which are identical or different, are hydrogen, $C_1$–$C_{18}$alkyl, $C_5$–$C_{12}$cycloalkyl which is unsubstituted or substituted by 1, 2 or 3 $C_1$–$C_4$alkyl; $C_3$–$C_{18}$alkenyl, phenyl which is unsubstituted or substituted by 1, 2 or 3 $C_1$–$C_4$alkyl or $C_1$–$C_4$alkoxy; $C_7$–$C_9$phenylalkyl which is unsubstituted or substituted on the phenyl by 1, 2 or 3 $C_1$–$C_4$alkyl; tetrahydrofurfuryl or $C_2$–$C_4$alkyl which is substituted in the 2, 3 or 4 position by —OH, $C_1$–$C_8$alkoxy, di($C_1$–$C_4$alkyl)amino or a group of the formula ($2g^{IV}$);

with Y being —O—, —$CH_2$—, —$CH_2CH_2$— or >N—$CH_3$, or —$N(R_{14})(R_{15})$ is additionally a group of the formula ($2g^{IV}$);

X is —O— or >N—$R_{16}$;
$R_{16}$ is hydrogen, $C_1$–$C_{18}$alkyl, $C_3$–$C_{18}$alkenyl, $C_5$–$C_{12}$cycloalkyl which is unsubstituted or substituted by 1, 2 or 3 $C_1$–$C_4$alkyl; $C_7$–$C_9$henylalkyl which is unsubstituted or substituted on the phenyl by 1, 2 or 3 $C_1$–$C_4$alkyl; tetrahydrofurfuryl, a group of the formula ($2g^V$), or $C_2$-$C_4$alkyl which is substituted in the 2, 3 or 4 position by —OH, $C_1$-$C_8$alkoxy, di($C_1$-$C_4$alkyl)amino or a group of the formula ($2g^{IV}$);

$R_{11}$ has one of the definitions given for $R_{16}$; and the radicals B have independently of one another one of the definitions given for A.

3) A Compound of the Formula (3g)

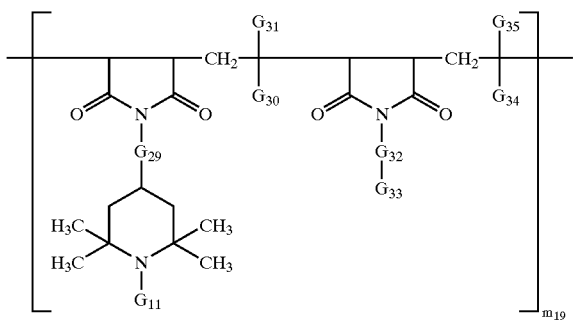

(3g)

in which $G_{11}$ is as defined under (a'), $G_{29}$ and $G_{32}$, independently of one another, are a direct bond or a —N($X_1$)—CO—$X_2$—CO—N($X_3$)— group, where $X_1$ and $X_3$, independently of one another, are hydrogen, $C_1$-$C_8$alkyl, $C_5$-$C_{12}$cycloalkyl, phenyl, $C_7$-$C_9$phenylalkyl or a group of the formula

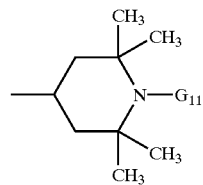

(3g)

and $X_2$ is a direct bond or $C_1$-$C_4$alkylene, $G_{30}$, $G_{31}$, $G_{34}$ and $G_{35}$, independently of one another, are hydrogen, $C_1$-$C_{30}$alkyl, $C_5$-$C_{12}$cycloalkyl or phenyl, $G_{33}$ is hydrogen, $C_1$-$C_{30}$alkyl, $C_5$-$C_{12}$cycloalkyl, $C_7$-$C_9$phenylalkyl, phenyl or a group of the formula (3g), and $m_{19}$ is a number from 1 to 50.

In the compounds of the formula (3g), the end group bonded to the 2,5-dioxopyrrolidine ring can be, for example, hydrogen, and the end group bonded to the —C($G_{34}$)($G_{35}$)- radical can be, for example,

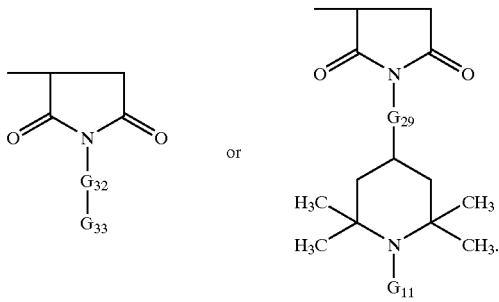

4) A Product Obtainable by Reacting an Intermediate Product, Obtained by Reaction of a Polyamine of the Formula (4g) with Cyanuric Chloride, with a Compound of the Formula (4g')

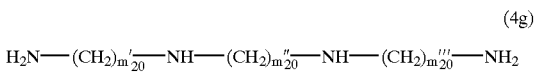

(4g)

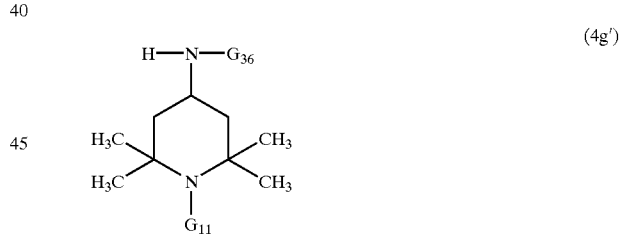

(4g')

in which $m'_{20}$, $m''_{20}$ and $m'''_{20}$, independently of one another, are a number from 2 to 12, $G_{36}$ is hydrogen, $C_1$-$C_{12}$alkyl, $C_5$-$C_{12}$cycloalkyl, phenyl or $C_7$-$C_9$phenylalkyl, and $G_{11}$ is as defined under (a').

In general, the above reaction product can be represented for example by a compound of the following 3 formulae. It can also be in the form of a mixture of these three compounds:

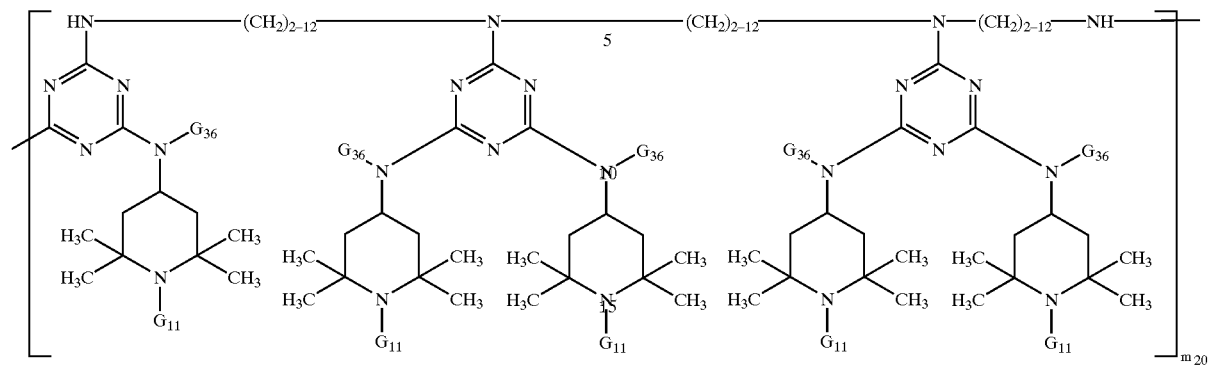
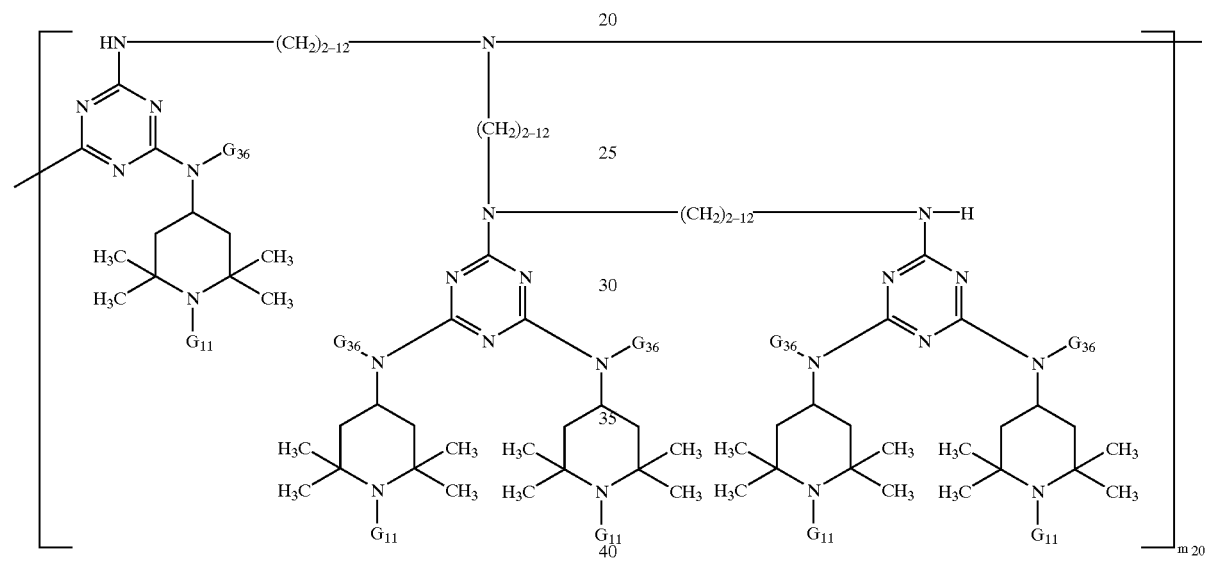
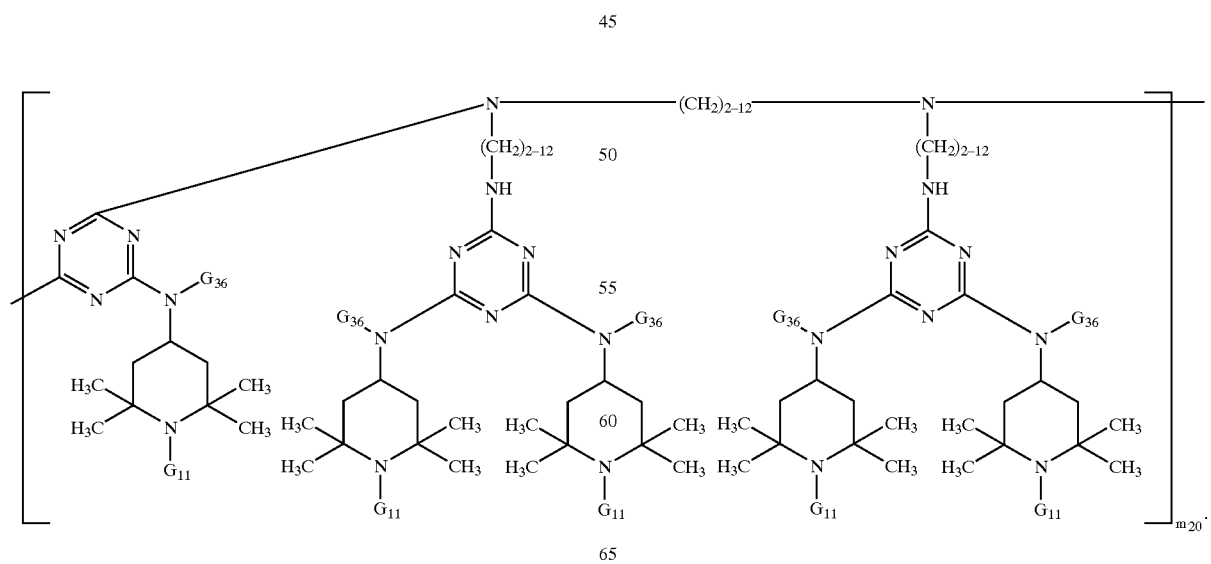

5) A Compound of the Formula (5g)

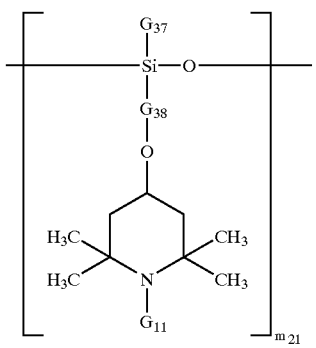

(5g)

in which $G_{11}$ is as defined under (a'), $G_{37}$ is $C_1$–$C_{10}$alkyl, $C_5$–$C_{12}$cycloalkyl, $C_1$–$C_4$alkyl-substituted $C_5$–$C_{12}$cycloalkyl, phenyl or $C_1$–$C_{10}$alkyl-substituted phenyl, $G_{38}$ is $C_3$–$C_{10}$alkylene and $m_{21}$ is a number from 1 to 50.

In the compounds of the formula (5g), the terminal group bonded to the silicon atom can be, for example, $(G_{37})_3Si$—O—, and the terminal group bonded to the oxygen can be, for example, —Si$(G_{37})_3$.

The compounds of the formula (5g) can also be in the form of cyclic compounds if $m_{21}$ is a number from 3 to 10, i.e. the free valences shown in the structural formula then form a direct bond.

6) A Compound of the Formula (6g)

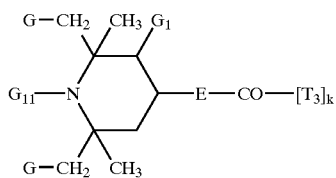

(6g)

where E is —O— or —ND'"- as defined under (e'), $T_3$ is ethylene or 1,2-propylene, is the repeating structural unit derived from an alpha-olefin copolymer with an alkyl acrylate or methacrylate; preferably a copolymer of ethylene and ethyl acrylate, and where k is 2 to 100.

7) A Compound of the Formula (7g)

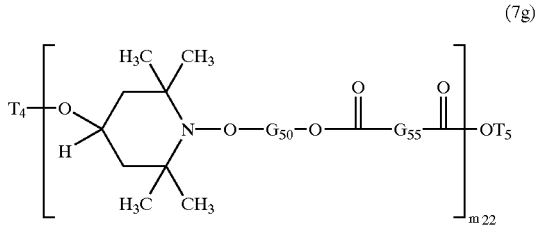

(7g)

wherein m is 1 to 100;

$G_{50}$ is straight or branched chain alkylene of 1 to 18 carbon atoms, cycloalkylene of 5 to 8 carbon atoms, cycloalkenylene of 5 to 8 carbon atoms, alkenylene of 3 to 18 carbon atoms, a straight or branched chain alkylene of 1 to 4 carbon atoms substituted by phenyl or by phenyl substituted by one or two alkyl of 1 to 4 carbon atoms, with the proviso that in formula (7g) successive hindered amine moieties can be oriented in either a head to head or head to tail fashion;

$T_4$ is hydrogen or
$T_4$ is

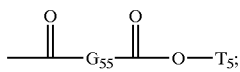

$G_{55}$ is a straight or branched chain alkylene of 1 to 18 carbon atoms, cycloalkylene or cycloalkenylene of 5 to 8 carbon atoms, phenylene or —NH-alkylene-NH— of 2 to 18 carbon atoms including 5-amino-1-aminomethyl-1,3,3-trimethylcyclohexane and —NH-xylylene-NH—;

$T_5$ is alkyl of 1 to 4 carbon atoms;

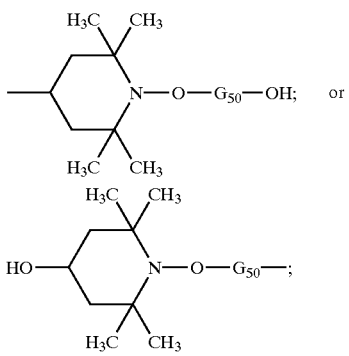

In the above shown oligomeric and polymeric compounds, examples of alkyl are methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl, eicosyl and docosyl;

examples of cycloalkyl are cyclopentyl, cyclohexyl, cycloheptyl and cyclooctyl;

an example of $C_7$–$C_9$phenylalkyl is benzyl; and examples of alkylene are ethylene, propylene, trimethylene, tetramethylene, pentamethylene, 2,2-dimethyltrimethylene, hexamethylene, trimethylhexamethylene, octamethylene and decamethylene.

(h') A Compound of the Formula (1h)

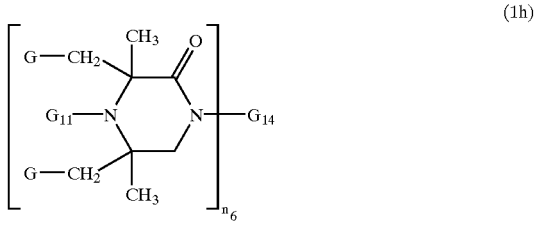

(1h)

in which $n_6$ is the number 1 or 2, G and $G_{11}$ are as defined under (a'), and $G_{14}$ is as defined under (b'), but $G_{14}$ cannot be —CONH-Z and —CH$_2$—CH(OH)—CH$_2$—O-D-O—.

(i') A Compound of the Formula (1i)

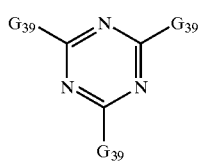

wherein the radicals $G_{39}$, independently of one another, are a group of the formula (1i-1)

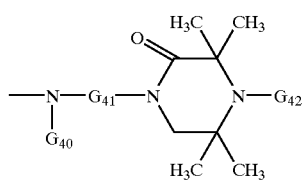

in which $G_{40}$ is $C_1$–$C_{12}$alkyl or $C_5$–$C_{12}$cycloalkyl, $G_{41}$ is $C_2$–$C_{12}$alkylene and $G_{42}$ is as defined for $G_{11}$ above.

Alkyl is for example $C_1$–$C_4$alkyl, in particular methyl, ethyl, propyl or butyl.

Cycloalkyl is preferably cyclohexyl.

Alkylene is for example ethylene, propylene, trimethylene, tetramethylene, pentamethylene, 2,2-dimethyltrimethylene or hexamethylene.

Alkenyl is preferably allyl.

Phenylalkyl is preferably benzyl.

Acyl is preferably acetyl.

(j') A Compound of the Formula (1j)

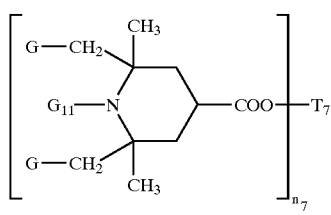

wherein G, $G_{11}$ are as defined above and when $n_7$ is 1, $T_7$ is hydrogen, $C_1$–$C_{12}$alkyl, $C_3$–$C_5$alkenyl, $C_7$–$C_9$aralkyl, $C_5$–$C_7$cycloalkyl, $C_2$–$C_4$hydroxyalkyl, $C_2$–$C_6$alkoxyalkyl, $C_6$–$C_{10}$aryl, glycidyl, a group of the formula —(CH$_2$)$_t$—COO-Q or of the formula —(CH$_2$)$_t$—O—CO-Q wherein t is 1 or 2, and Q is $C_1$–$C_4$alkyl or phenyl; or when $n_7$ is 2, $T_7$ is $C_2$–$C_{12}$alkylene, $C_6$–$C_{12}$arylene, a group —CH$_2$CH(OH)—CH$_2$—O—X—O—CH$_2$—CH(OH)—CH$_2$— wherein X is $C_2$–$C_{10}$alkylene, $C_6$–$C_{15}$arylene or $C_6$–$C_{12}$cycloalkylene, or a group —CH$_2$CH(OZ')CH$_2$—(OCH$_2$—CH(OZ')CH$_2$)$_2$— wherein Z' is hydrogen, $C_1$–$C_{18}$alkyl, allyl, benzyl, $C_2$–$C_{12}$alkanoyl or benzoyl.

(k') A Compound of the Formula (1k)

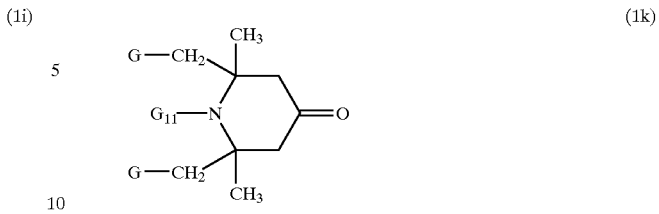

wherein G, $G_{11}$ are as defined above.

(l') A Compound of the Formula (1l)

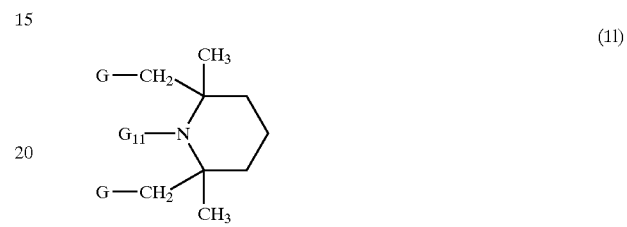

wherein G, $G_{11}$ are as defined above.

(m') A Compound of the Formula (1m)

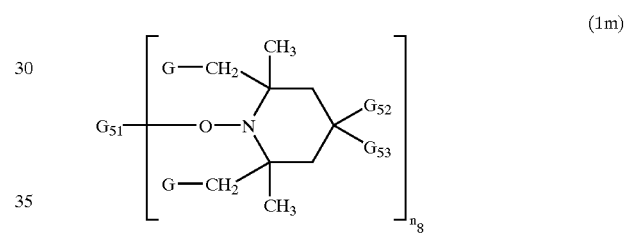

wherein G is as defined above, $n_8$ is 1, 2 or 3, if $n_8$ is 1, $G_{51}$ is -$G_{50}$-O—CO-$G_{56}$; $G_{52}$ is —O—CO-$G_{56}$; and $G_{53}$ is hydrogen; where $G_{56}$ is alkyl or —NH-alkyl of 1 to 18 carbon atoms or —NH-cycloalkyl of 5 to 8 carbon atoms;

if $n_8$ is 2, $G_{51}$ is alkylene of 1 to 18 carbon atoms, hydroxyalkylene of 3 to 18 carbon atoms, cycloalkylene of 5 to 8 carbon atoms, cycloalkenylene or hydroxycycloalkylene of 5 to 8 carbon atoms, alkenylene of 3 to 18 carbon atoms, or a straight or branched chain alkylene of 1 to 4 carbon atoms or hydroxyalkylene of 2 to 4 carbon atoms substituted by phenyl or by phenyl substituted by one or two alkyl of 1 to 4 carbon atoms; or $G_{51}$ is a divalent acyl radical of an aliphatic, cycloaliphatic, araliphatic or aromatic dicarboxylic acid or of a dicarbamic acid, preferably an acyl radical of an aliphatic dicarboxylic acid having 2–18 C atoms, of a cycloaliphatic or aromatic dicarboxylic acid having 8–14 C atoms, if $n_8$ is 3, $G_{51}$ is alkanetriyl of 1 to 18 carbon atoms, hydroxyalkanetriyl of 3 to 18 carbon atoms, cycloalkanetriyl of 5 to 8 carbon atoms, cycloalkenetriyl of 5 to 8 carbon atoms, alkenetriyl of 3 to 18 carbon atoms, a straight or branched chain alkanetriyl of 1 to 4 carbon atoms substituted by phenyl or by phenyl substituted by one or two alkyl of 1 to 4 carbon atoms;

if $n_8$ is 2 or 3,
$G_{52}$ is —O-$G_{12}$; —N($G_{13}$)$G_{14}$; —O-$G_{15}$; —COO-$T_7$; or is a group of one of the formulae

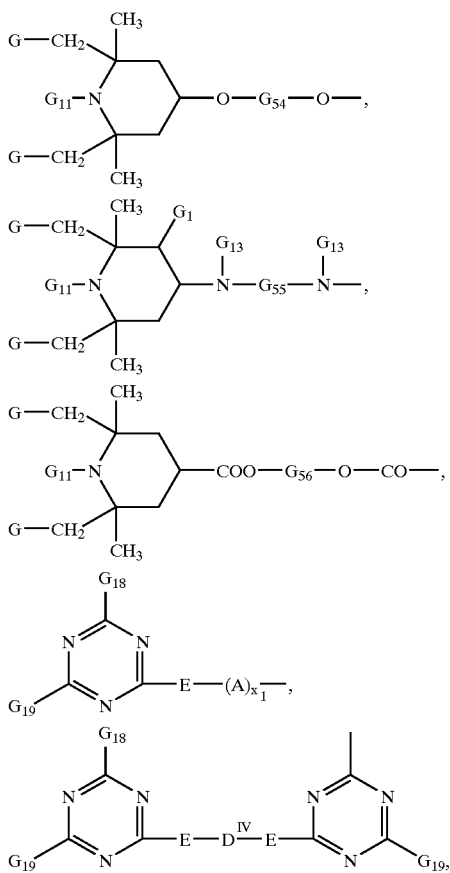

and $G_{53}$ is hydrogen or, if $G_{52}$ is —O-$G_{15}$, is O-$G'_{15}$; or $G_{52}$ and $G_{53}$ together are =O; or a group of the formula

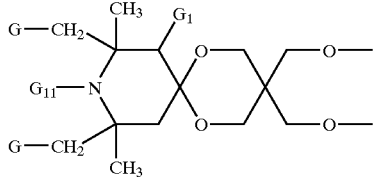

where $G_{11}$ and $G_{12}$ are as defined above under (a') if $n_1$ is 1; $G_{13}$ and $G_{14}$ are as defined above under (b') if $n_2$ is 1; $G_{15}$ and $G'_{15}$ are as defined above under (c') if $n_3$ is 1; $G_{18}$, $G_{19}$, A, E, $D^{IV}$, $x_1$ are as defined above under (e'); $T_7$ is as defined above under (j') if $n_7$ is 1; $G_{54}$ is as defined for $G_{12}$ under (a') if $n_1$ is 2; $G_{55}$ is as defined for $G_{14}$ under (b') if $n_2$ is 2; $G_{56}$ is as defined for $T_7$ under (j') if $n_7$ is 2.

Of special technical importance is a sterically hindered amine light stabilizer of the hydroxyhydrocarbyloxyamine class, wherein $E_1$ is preferably $C_1$–$C_{18}$alkyl, $C_5$–$C_{12}$cycloalkyl or $C_7$–$C_{15}$aralkyl each of which is substituted in the aliphatic part by 1–3 OH groups, especially 1 OH group.

Thus, present invention also pertains to a flame retardant composition stabilized against deleterious effects of light and weathering comprising (a) a polyolefin, and
(b) a flame retardant selected from
  b1) melamine based flame retardants and/or ammonium polyphosphate,
  b2) bis-(hexachlorocyclopentadieno) cyclooctane,
  b3) tris-(2,3-dibromopropyl)-isocyanurate,
  b4) ethylene-bis-tetrabromophthalimide; and
(c) a sterically hindered amine light stabilizer of the hydroxyhydrocarbyloxyamine class.

Further, the instant invention pertains to a process for imparting light stability and flame retardancy to a thermoplastic polymer, which process comprises adding to said polymer a combination of the flame retardant tris-(2,3-dibromopropyl)-isocyanurate and a sterically hindered amine light stabilizer of the hydrocarbyloxyamine or hydroxyhydrocarbyloxyamine class. A flame retardant and light stabilized composition comprising a) a polyolefin,
b) tris-(2,3-dibromopropyl)-isocyanurate as a flame retardant and
c) a sterically hindered amine light stabilizer of the hydrocarbyloxyamine or hydroxyhydrocarbyloxyamine class is another preferred object of present invention.

Preferred components a and c and amounts thereof in the novel process and novel compositions are as described above.

Components b and c of the instant invention and optional further components may readily be incorporated into the polymer by conventional techniques, at any convenient stage prior to the manufacture of shaped articles therefrom. For example, the additives may be mixed with the polymer in dry powder form, or a suspension or emulsion of the stabilizer may be mixed with a solution, suspension, or emulsion of the polymer. The additives may be added to component (a), individually or mixed with one another. If desired, the individual components can be mixed with one another in the melt (melt blending) before incorporation into the material to be stabilized. Components b and/or c and optional further additives may be incorporated, for example, before or after molding or also by applying the dissolved or dispersed stabilizer mixture to the material to be stabilized, with or without subsequent evaporation of the solvent. The additives of component b and/or c as well as further additives can also be added to the material to be stabilized in the form of a masterbatch which contains these components in a concentration of, for example, about 2.5% to about 25% by weight; in such operations, the polymer can be used in the form of powder, granules, solutions, suspensions or in the form of latices.

Incorporation can take place prior to or during the shaping operation, or by applying the dissolved or dispersed compound to the polymer, with or without subsequent evaporation of the solvent. In the case of elastomers, these can also be stabilized as latices. A further possibility for incorporating the stabilizers of the invention into polymers is to add them before, during or directly after the polymerization of the corresponding monomers. In the case of addition prior to or during the polymerization, the stabilizers of the invention can also act as a regulator of the chain length of the polymers (chain terminator).

Components b and c of the invention can judiciously be incorporated by the following methods:

as emulsion or dispersion (e.g. to latices or emulsion polymers),
as a dry mixture during the mixing in of additional components or polymer mixtures,
by direct introduction into the processing apparatus (e.g. extruders, internal mixers, etc),
as solution or melt.

The additive combination of present components b and c is useful for many applications, especially outdoor applications, including the following:

Thermoplastic olefins (TPO), e.g. paintable thermoplastic olefins
Polypropylene molded articles
Polyethylene film
Molded polypropylene with brominated flame retardants
Molded thermoplastic olefin with brominated flame retardants
Polethylene film with brominated flame retardants
Thermoplastic elastomers with other costabilizers
Grease-filled wire and cable insulation
Coatings over plastic substrates
Polyolefin tanks or containers containing chemicals
Polyolefin films with an antifog agent
Polyolefin films with IR thermal fillers such as hydrotalcites, e.g. DHT4A
Polyolefin films with an antistatic agent
Flame-resistant molded polypropylene articles
Flame-resistant molded thermoplastic olefins
Flame-resistant polethylene film
Pre-formed films for lamination to plastic substrates
Electronic appliance
Containers, boxes, bins for storage and transportation
Automotive applications e.g. dashboard, back board
Furniture e.g. stadion seats, public seats
Roofing sheets
Roofing membranes
Flooring materials
Liners
Profiles, especially window and door profiles
Geomembranes.

The materials containing the stabilizers described herein can be used for the production of moldings, extruded articles, rotomolded articles, injection molded articles, blow molded articles, mono- and multilayer films, extruded profiles, surface coatings and the like.

The resulting stabilized compositions of the invention may optionally also contain various conventional additives, preferably in amounts from 0.01 to 10%, more preferably from about 0.025 to about 2%, and especially from about 0.1 to about 1% by weight of component (a), such as the materials listed below, or mixtures thereof.

1. Antioxidants 1.1. Alkylated monophenols, for example 2,6-di-tert-butyl-4-methylphenol, 2-tert-butyl-4,6-di-methylphenol, 2,6-di-tert-butyl-4-ethylphenol, 2,6-di-tert-butyl-4-n-butylphenol, 2,6-di-tert-bu-tyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example 2,6-di-nonyl-4-methylphenol, 2,4-dimethyl-6-(1'-methylundec-1'-yl) phenol, 2,4-dimethyl-6-(1'-methylheptadec-1'-yl)phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl) adipate.

1.4. Tocopherols, for example α-tocopherol, β-tocopherol, γ-tocopherol, δ-tocopherol and mixtures thereof (vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-methylphenol), 4,4'-thiobis(3,6-di-sec-amylphenol), 4,4'-bis(2,6-dimethyl-4-hydroxyphenyl) disulfide.

1.6. Alkylidenebisphenols, for example 2,2'-methylenebis (6-tert-butyl-4-methylphenol), 2,2'-methylenebis(6-tert-butyl-4-ethylphenol), 2,2'-methylenebis[4-methyl-6-(α-methylcyclohexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl) butyrate], bis(3-tert-butyl-4-hydroxy-5-methyl-phenyl) dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis(3,5-di-tert-butyl-4-hydroxyphenyl)propane, 2,2-bis-(5-tert-butyl-4-hydroxy2-methylphenyl)-4-n-dodecylmercaptobutane, 1,1,5,5-tetra(5-tert-butyl-4-hydroxy-2-methylphenyl)pentane.

1.7. O-, N- and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxy-benzyl)sulfide, isooctyl-3,5-di-tert-butyl-4-hydroxybenzylmercaptoacetate.

1.8. Hydroxybenzylated malonates, for example dioctadecyl-2,2-bis(3,5-di-tert-butyl-2-hydroxybenzyl) malonate, di-octadecyl-2-(3-tert-butyl-4-hydroxy-5-methylbenzyl)malonate, didodecylmercaptoethyl-2,2-bis(3,5-di-tert-butyl-4-hydroxybenzyl)malonate, bis[4-(1,1,3,3-tetra-methylbutyl)phenyl]-2,2-bis(3,5-di-tert-butyl-4-hydroxybenzyl)malonate.

1.9. Aromatic hydroxybenzyl compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine compounds, for example 2,4-bis (octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris-(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl) isocyanurate, 2,4,6-tris-(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis-(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane; 3,9-bis[2-{3-(3-tert-butyl-4-hydroxy-5-methylphenyl)propionyloxy}-1,1-dimethylethyl]-2,4,8,10-tetraoxaspiro[5.5]-undecane.

1.15. Esters of β-(3,5-dicyclohexyl-4-hydroxyphenyl) progionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl) propionic acid e.g. N,N'-bis(3,5-di-tert-butyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide (Naugard®XL-1, supplied by Uniroyal).

1.18. Ascorbic acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxy-diphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino)propane, (o-tolyl)biguanide, bis[4-(1',3'-dimethylbutyl)phenyl]amine, tertoctylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyidiphenylamines, a mixture of mono- and dialkylated tert-butyidiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octylphenothiazines, N-allylphenothiazine, N,N,N',N'-tetraphenyl-1,4-diaminobut-2-ene, N,N-bis-(2,2,6,6-tetramethyl-piperid-4-yl-hexamethylenediamine, bis(2,2,6,6-tetramethylpiperid-4-yl)-sebacate, 2,2,6,6-tetramethylpiperidin-4-one, 2,2,6,6-tetramethylpiperidin-4-ol.

2. UV Absorbers and Light Stabilisers 2.1. 2-(2'-Hydroxyphenyl)benzotriazoles, for example 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis((α,α-dimethylbenzyl)-2'-hydroxyphenyl)benzotriazole, 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl)

phenylbenzotriazole, 2,2'-methylenebis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; [R—CH$_2$CH$_2$—COO—CH$_2$CH$_2$—]$_2$, where R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)phenyl]-benzotriazole; 2-[2'-hydroxy-3'-(1,1,3,3-tetramethylbutyl)-5'-(α,α-dimethylbenzyl)phenyl]benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, for example 4-tert-butylphenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxycinnamate, butyl α-cyano-β-methyl-p-methoxycinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thiobis[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenylundecylketoxime, nickel complexes of 1-phenyl-4-lauroyl-5-hydroxypyrazole, with or without additional ligands.

2.6. Conventional sterically hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butanetetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)-malonate, 3-n-octyl-7,7,9,9-tetramethyl-1,3,8-triazaspiro[4.5]decane-2,4-dione, linear or cyclic condensates of N,N'-bis(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl)pyrrolidine-2,5-dione, 5-(2-ethylhexanoyl)-oxymethyl-3,3,5-trimethyl-2-morpholinone, 1,3,5-tris(N-cyclohexyl-N-(2,2,6,6-tetramethylpiperazin-3-on-4-yl)amino)-s-triazine, 1,3,5-tris(N-cyclohexyl-N-(1,2,2,6,6-pentamethylpiperazin-3-on-4-yl)amino)-s-triazine, a mixture of 4-hexadecyloxy- and 4-stearyloxy-2,2,6,6-tetramethylpiperidine, a condensate of N,N'-bis(2,2,6,6-tetramethyl-4-piperidyl)hexamethylenediamine and 4-cyclohexylamino-2,6-dichloro-1,3,5-triazine, a condensate of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); a condensate of 1,6-hexanediamine and 2,4,6-trichloro-1,3,5-triazine as well as N,N-dibutylamine and 4-butylamino-2,2,6,6-tetramethylpiperidine (CAS Reg. No. [192268-64-7]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxo-spiro[4,5]decane, a reaction product of 7,7,9,9-tetramethyl-2-cycloundecyl-1-oxa-3,8-diaza-4-oxospiro-[4,5]decane and epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl)-hexamethylenediamine, a diester of 4-methoxymethylenemalonic acid with 1,2,2,6,6-pentamethyl-4-hydroxypiperidine, poly[methylpropyl-3-oxy-4-(2,2,6,6-tetramethyl-4-piperidyl)]siloxane, a reaction product of maleic acid anhydride-α-olefin copolymer with 2,2,6,6-tetramethyl-4-aminopiperidine or 1,2,2,6,6-pentamethyl-4-aminopiperidine.

2.7. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2- hydroxypropoxy)-2-hydroxyphenyl]-4,6-bis(2,4-dimethylphenyl)1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy) phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine.

3. Metal deactivators, for example N,N'-diphenyloxamide, N-salicylal-N'-salicyloyl hydrazine, N,N'-bis(salicyloyl) hydrazine, N,N'-bis(3,5-di-tert-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl) oxalyl dihydrazide, N,N'-bis(salicyloyl)thiopropionyl dihydrazide.

4. Phosphites and phosphonites, for example triphenyl phosphite, diphenylalkyl phosphites, phenyldialkyl phosphites, tris(nonylphenyl) phosphite, trilauryl phosphite, trioctadecyl phosphite, distearylpentaerythritol diphosphite, tris(2,4-di-tert-butylphenyl) phosphite, diisodecyl pentaerythritol diphosphite, bis(2,4-di-tert-butylphenyl) pentaerythritol diphosphite, bis(2,4-dicumylphenyl) pentaerythritol diphosphite, bis(2,6-di-tert-butyl-4-methylphenyl)pentaerythritol diphosphite, diisodecyloxypentaerythritol diphosphite, bis(2,4-di-tert-butyl-6-methylphenyl)-pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, bis(2,4-di-tert-butyl-6-methylphenyl)methyl phosphite, bis(2,4-di-tert-butyl-6-methylphenyl)ethyl phosphite, 6-fluoro-2,4,8,10-tetra-tert-butyl-12-methyl-dibenz[d,g]-1,3,2-dioxaphosphocin, 2,2',2''-nitrilo-[triethyltris(3,3',5,5'-tetra-tert-butyl-1,1'-biphenyl-2,2'-diyl)phosphite], 2-ethylhexyl (3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane.

The following phosphites are especially preferred:
Tris(2,4-di-tert-butylphenyl)phosphite (Irgafos®168, Ciba-Geigy), tris(nonylphenyl)phosphite,

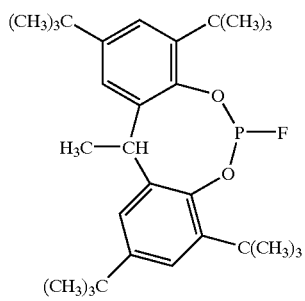
(A)

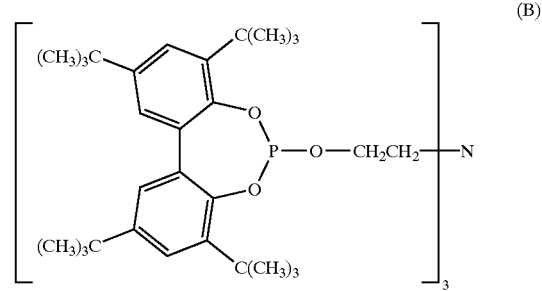
(B)

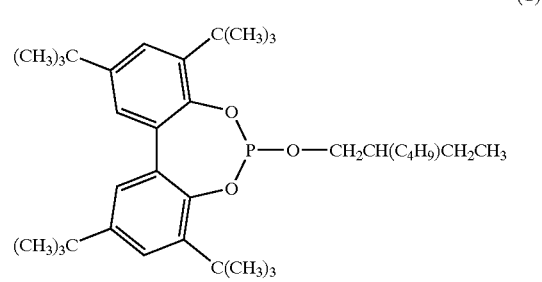
(C)

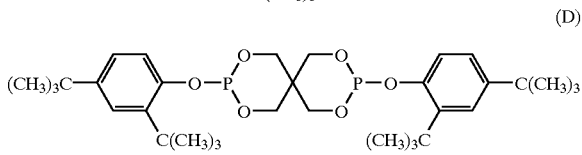
(D)

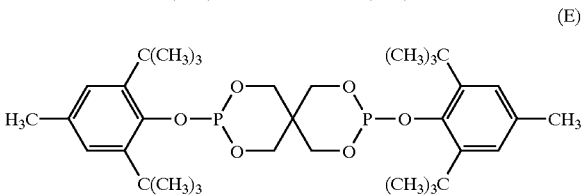
(E)

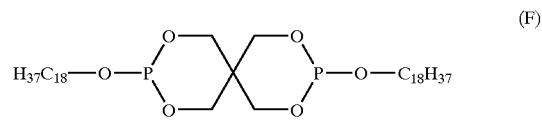
(F)

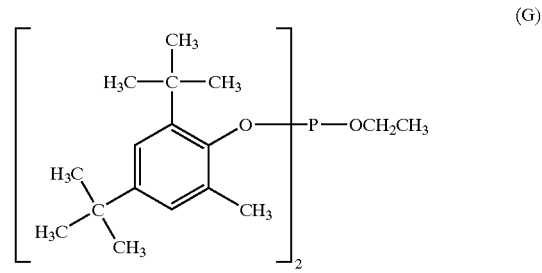
(G)

5. Hydroxalamines, for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

6. Nitrones, for example N-benzyl-alpha-phenyinitrone, N-ethyl-alpha-methylnitrone, N-octylalpha-heptyinitrone, N-lauryl-alpha-undecyinitrone, N-tetradecyl-alpha-tridecylnitrone, N-hexadecyl-alpha-pentadecylnitrone, N-octadecyl-alpha-heptadecyinitrone, N-hexadecyl-alphaheptadecyinitrone, N-ocatadecyl-alpha-pentadecyinitrone, N-heptadecyl-alpha-heptadecylnitrone, N-octadecyl-alpha-hexadecylnitrone, nitrone derived from N,N-dialkylhydroxylamine derived from hydrogenated tallow amine.

7. Thiosynergists, for example dilauryl thiodipropionate or distearyl thiodipropionate.

8. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

9. Polyamide stabilisers, for example copper salts in combination with iodides and/or phosphorus compounds and salts of divalent manganese.

10. Basic co-stabilisers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example calcium stearate, zinc stearate, magnesium behenate, magnesium stearate, sodium ricinoleate and potassium palmitate, antimony pyrocatecholate or zinc pyrocatecholate.

11. Nucleating agents, for example inorganic substances, such as talcum, metal oxides, such as titanium dioxide or magnesium oxide, phosphates, carbonates or sulfates of, preferably, alkaline earth metals; organic compounds, such as mono- or polycarboxylic acids and the salts thereof, e.g. 4-tert-butylbenzoic acid, adipic acid, diphenylacetic acid, sodium succinate or sodium benzoate; polymeric compounds, such as ionic copolymers (ionomers). Especially preferred are 1,3:2,4-bis(3',4'-dimethylbenzylidene) sorbitol, 1,3:2,4-di(paramethyidibenzylidene)sorbitol, and 1,3:2,4-di(benzylidene)sorbitol.

12. Fillers and reinforcing agents, for example calcium carbonate, silicates, glass fibres, glass beads, asbestos, talc, kaolin, mica, barium sulfate, metal oxides and hydroxides, carbon black, graphite, wood flour and flours or fibers of other natural products, synthetic fibers.

13. Other additives, for example plasticisers, lubricants, emulsifiers, pigments, rheology additives, catalysts, flow-control agents, optical brighteners, flameproofing agents, antistatic agents and blowing agents.

14. Benzofuranones and indolinones, for example those disclosed in U.S. Pat. Nos. 4,325,863; 4,338,244; 5,175,312; 5,216,052; 5,252,643; DE-A-4316611; DE-A-4316622; DE-A-4316876; EP-A-0589839 or EP-A-0591102 or 3-[4-(2-acetoxyethoxy)-phenyl]-5,7-di-tert-butyl-benzofuran-2-one, 5,7-di-tert-butyl-3-[4-(2-stearoyloxyethoxy)phenyl] benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butyl-benzofuran-2-one, 3-(3,5-dimethyl-4-pivaloyloxyphenyl)-5,7-di-tert-butyl-benzofuran-2-one, 3-(3,4-dimethylphenyl)-5,7-di-tert-butyl-benzofuran-2-one, 3-(2,3-dimethylphenyl)-5,7-di-tert-butyl-benzofuran-2-one.

15. Amine oxides, for example amine oxide derivatives as disclosed in U.S. Pat. Nos. 5,844,029 and 5,880,191, didecyl methyl amine oxide, tridecyl amine oxide, tridodecyl amine oxide and trihexadecyl amine oxide. U.S. Pat. Nos. 5,844,029 and 5,880,191 disclose the use of saturated hydrocarbon amine oxides towards the stabilization of thermoplastic resins. It is disclosed that the thermoplastic compositions may further contain a stabilizer or mixture of stabilizers selected from phenolic antioxidants, hindered amine light stabilizers, ultraviolet light absorbers, organic phosphorus compounds, alkaline metal salts of fatty acids and thiosynergists. The co-use of amine oxides with other stabilizers towards stabilizing polyolefins is not exemplified.

Further preferred compositions comprise, in addition to components (b) and (c) further additives, in particular phenolic antioxidants, light stabilizers or processing stabilizers. Particularly preferred additives are phenolic antioxidants (item 1 of the list), further sterically hindered amines (item 2.6 of the list), light stabilizers of the benzotriazole and/or o-hydroxyphenyltriazine class (items 2.1 and 2.8 of the list), phosphites and phosphonites (item 4 of the list) and peroxide-destroying compounds (item 5.) of the list.

Additional additives (stabilizers) which are also particularly preferred are benzofuran-2-ones, such as described, for example, in U.S. Pat. Nos. 4,325,863, 4,338,244 or 5,175,312.

The instant composition can additionally contain another UV absorber selected from the group consisting of the s-triazines, the oxanilides, the hydroxybenzophenones, benzoates and the α-cyanoacrylates. Particularly, the instant composition may additionally contain an effective stabilizing amount of at least one other 2-hydroxyphenyl-2H-benzotriazole; another tris-aryl-s-triazine; or hindered amine or mixtures thereof. Preferred are additional components selected from pigments, dyes, plasticizers, antioxidants, thixotropic agents, levelling assistants, basic costabilizers, further light stabilizers like UV absorbers and/or sterically hindered amines, metal passivators, metal oxides, organo-phosphorus compounds, hydroxylamines, and mixtures thereof, especially pigments, phenolic antioxidants, calcium stearate, zinc stearate, UV absorbers of the 2-(2'-hydroxyphenyl)benzotriazole and 2-(2-Hydroxyphenyl)-1,3,5-triazine classes, and sterically hindered amines.

It is one of the findings of pressnt invention that an especially improved performance, both in light stability and flame retardancy, may be obtained if the thermoplastic polymer contains, besides the flame retardant, a combination of a conventional sterically hindered amine of high molecular weight with a low molecular weight sterically hindered amine of the hydroxyhydrocarbyloxyamine class. Thus, present invention also pertains to a flame retardant composition stabilized against deleterious effects of light and weathering comprising A) a thermoplastic polymer,
B) a flame retardant selected from ammonium polyphosphate, halogenated and/or melamine based flame retardants, and
C) a combination of sterically hindered amine light stabilizer comprising
   C1) a low molecular weight sterically hindered amine of the hydroxyhydrocarbyloxyamine class, and
   C2) a conventional high molecular weight sterically hindered amine.

Preferred polymers (A) in these compositions are as initially explained (a).

The halogenated flame retardants useful as component (B) in compositions of present invention may be selected from organic aromatic halogenated compounds such as halogenated benzenes, biphenyls, phenols, ethers or esters thereof, bisphenols, diphenyloxides, aromatic carboxylic acids or polyacids, anhydrides, amides or imides thereof; organic cycloaliphatic or polycycloaliphatic halogenated compounds; and organic aliphatic halogenated compounds such as halogenated paraffins, oligo- or polymers, alkylphosphates or alkylisocyanurates. These components are largely known in the art, see e.g. U.S. Pat. No. 4,579,906 (e.g. col. 3, lines 30–41), U.S. Pat. No. 5,393,812; see also Plastics Additives Handbook, Ed. by H. Zweifel, 5$^{th}$ Ed., Hanser Publ., Munich 2001, pp. 681–698.

The halogenated flame retardant may be, for example, a chlorinated or brominated compound, e.g. selected from the following compounds:

Chloroalkyl phosphate esters (ANTIBLAZE® AB-100, Albright & Wilson; FYROL® FR-2, Akzo Nobel),
  polybrominated diphenyl oxide (DE-60F, Great Lakes Corp.),
  decabromodiphenyl oxide (DBDPO; SAYTEX® 102E),
  tris[3-bromo-2,2-bis(bromomethyl)propyl]phosphate (PB 370®, FMC Corp.),
  bis(2,3-dibromopropyl ether) of bisphenol A (PE68),
  brominated epoxy resin,
  ethylene-bis(tetrabromophthalimide) (SAYTEX® BT-93),
  bis(hexachlorocyclopentadieno)cyclooctane (DECLORANE PLUS®),
  chlorinated paraffins,
  1,2-bis(tribromophenoxy)ethane (FF680),
  tetrabromo-bisphenol A (SAYTEX® RB100),
  ethylene bis-(dibromo-norbornanedicarboximide) (SAYTEX® BN-451),
  bis-(hexachlorocyclopentadieno)cyclooctane,
  tris-(2,3-dibromopropyl)-isocyanurate,
  ethylene-bis-tetrabromophthalimide.

Preferred as component (B) are brominated flame retardants.

Most preferred flame retardants (B) in these compositions of the invention are
  B1) melamine based flame retardants and/or ammonium polyphosphate,
  B2) bis-(hexachlorocyclopentadieno) cyclooctane,
  B3) tris-(2,3-dibromopropyl)-isocyanurate,
  B4) ethylene-bis-tetrabromophthalimide,
  B5) 1,2,5,6,9,10-hexabromo-cyclo-dodecane,
  B6) 1,2-bis(pentabromophenyl)ethane,
  B7) tris(3-bromo-2,2-(bromomethyl)propyl) phosphate.

Especially preferred flame retardants (B) in these compositions of the invention are as initially explained for component (b).

The flame retardant (B) is often contained in an amount from 0.5 to 50% by weight of the polymeric substrate (A); more preferred dosages for the most preferred flame retardants (B) are as initially explained for component (b).

The ratio (B):(C) in these compositions is preferably in the range from 20:1 to 250:1.

The ratio (C1):(C2) in these compositions is often in the range from 1:5 to 5:1. In case that the polymeric substrate (A) is a polyolefin, the low molecular weight component (C1) is preferably used in about the same or in a larger amount than (C2), e.g. 40–95 parts by weight of (C1) on 100 total parts by weight of component (C) consisting of (C1) and (C2).

In a polyolefin with main component polyethylene, the low molecular weight part (C1) often will amount about half of the total amount of component (C), e.g. from 40 to about 70, more specifically from 45 to about 55% by weight of total component (C).

In a polyolefin with main component polypropylene, the low molecular weight part (C1) often will amount rather more than half of the total amount of component (C), e.g. from 50 to about 90, more specifically from 60 to about 85% by weight of total component (C).

Under such conditions in a polyolefin, the low molecular weight component (C1) may also be of the hydrocarbyloxyamine class. Thus, another object of th invention pertains to a composition comprising
A) a polyolefin,
B) a flame retardant selected from ammonium polyphosphate halogenated and/or melamine based flame retardants, and
C) a combination of sterically hindered amine light stabilizers comprising, on 100 parts by weight of total component (C),
  C1) 40 to 95 parts by weight a low molecular weight sterically hindered amine of the hydrocarbyloxyamine class, and
  C2) 5 to 60 parts by weight of a conventional high molecular weight sterically hindered amine.

The low molecular weight sterically hindered amine of the hydroxyhydrocarbyloxyamine or, where appropriate, hydrocarbyloxyamine class (C1) usually is from the molecular weight range 200 to 1000 g/mol, especially 300 to 800 g/mol. It may be one compound or a mixture of compounds, each fulfilling the molecular weight condition. Especially preferred are, for example,
1-cyclohexyloxy-2,2,6,6-tetramethyl-4-octadecylaminopiperidine;
bis(1-octyloxy-2,2,6,6-tetramethylpiperidin-4-yl)sebacate;
bis(1-cyclohexyloxy-2,2,6,6-tetramethylpiperidin-4-yl) adipate;
1-(2-hydroxy-2-methylpropoxy)-4-octadecanoyloxy-2,2,6,6-tetramethylpiperidine.

The high molecular weight sterically hindered amine (C2) is of the conventional type containing 2,2,6,6-tetramethyl-4-piperidyl moieties whose nitrogen atoms are unsubstituted (secondary sterically hindered amine) or substituted by alkyl, especially methyl (alkylated tertiary sterically hindered amine) or are part of a polymeric backbone (polymeric tertiary sterically hindered amine). It usually is from the molecular weight range 1200 to 10000 g/mol, especially 1500 to 5000 g/mol. Examples for such compounds useful in the composition of the invention can be found among those listed under item 2.6 above, e.g. the following compounds:

Examples for Secondary Sterically Hindered Amines of High Molecular Weight

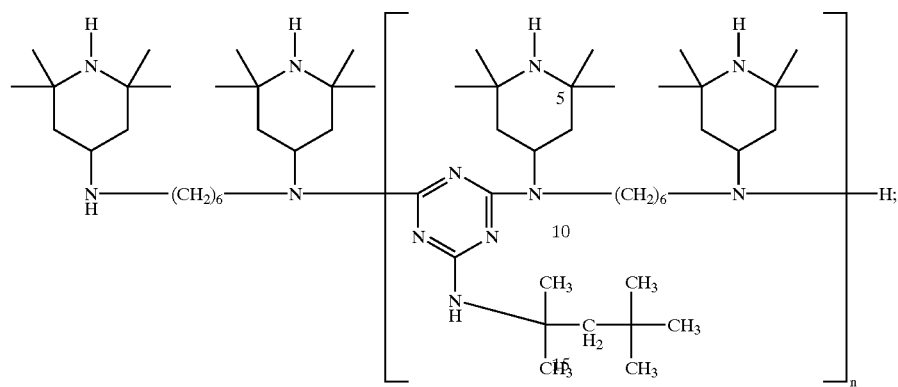
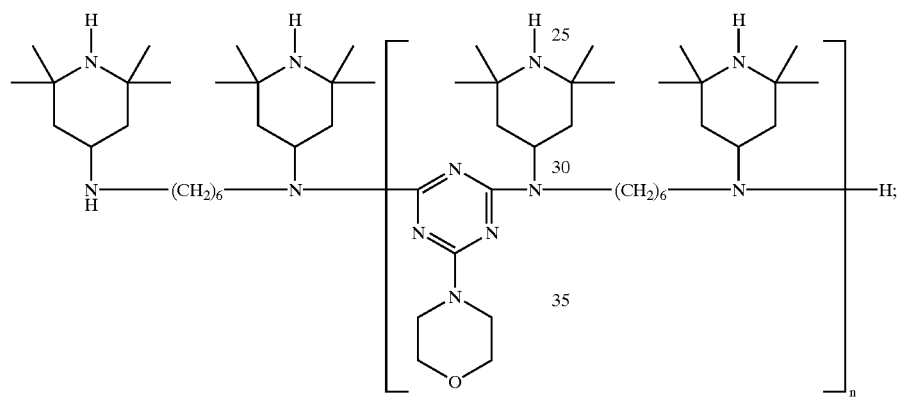
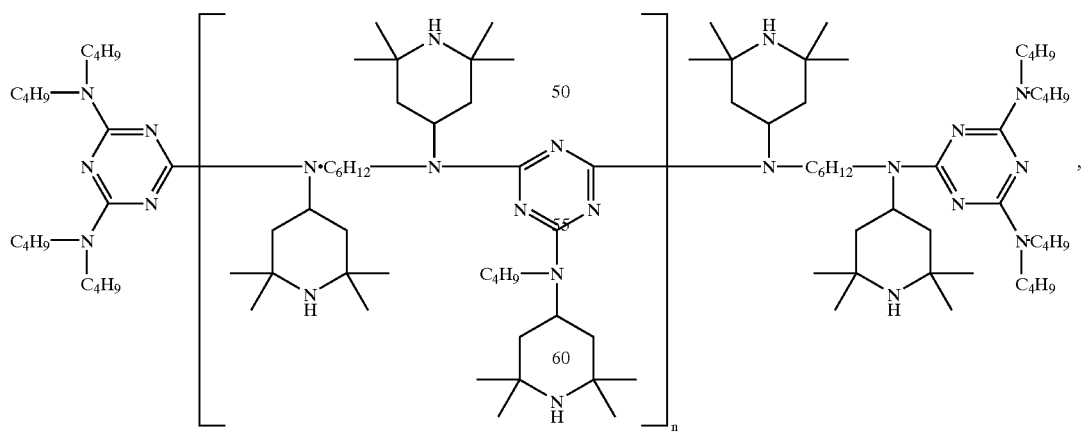

where n is mainly from the range 3–5.

Examples for Methylated Tertiary Sterically Hindered Amines of High Molecular Weight

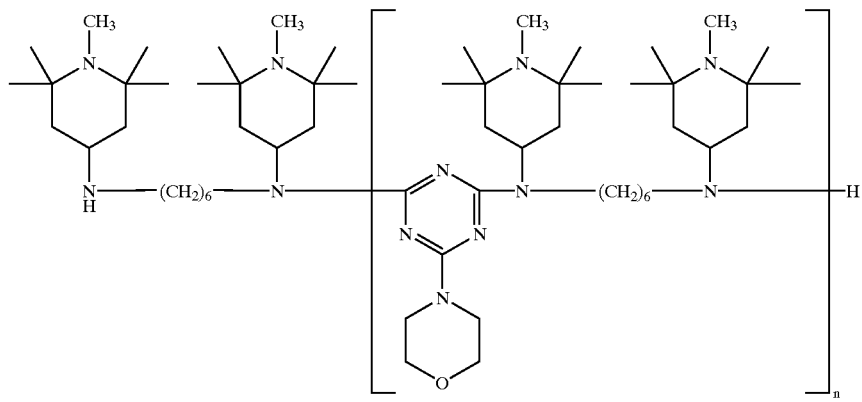

with n as defined above;
R—NH—(CH$_2$)$_3$—N(R)—(CH$_2$)$_2$—N(R)—(CH$_2$)$_3$—NH—R, wherein R is

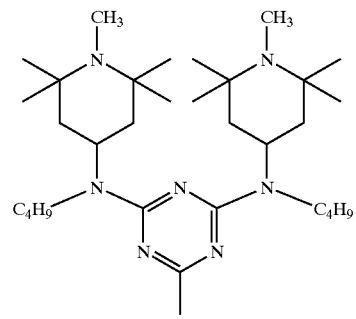

(CAS-No. 106990-43-6).

Example for Polymeric Tertiary Sterically Hindered Amine of High Molecular Weight

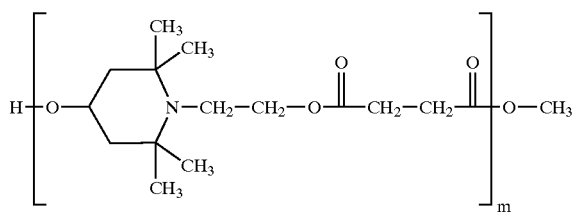

(M$_n$: >2500; CAS-No. 65447-77-0).

Especially preferred compounds of component (C2) are those containing 2,2,6,6-tetramethyl-4-piperidyl moieties whose nitrogen atoms are unsubstituted or alkyl, especially methyl substituted. Especially preferred compounds of component (C2) are also containing triazine moieties as structural backbones.

In general, component (C) is contained in an amount from 0.01 to 10%, preferably from 0.05 to 5% by weight, especially from 0.1 to 3% by weight, based on the polymer component (A). The weight ratio (C1):(C2) preferably ranges from 1:10 to 10:1; most preferably from 1:1 to 10:1.

Further components optionally to be used in these compositions of the invention, and methods of using them, are as initially explained.

The following examples are for illustrative purposes only and are not to be construed to limit the instant invention in any manner whatsoever. Room temperature depicts a temperature in the range 20–25° C. Percentages are by weight unless otherwise indicated.

Abbreviations:

v parts by volume
w parts by weight
$^1$Hnmr nuclear magnetic resonance (NMR) of $^1$H
m/z mass spectrometry (atomic units)
amu molecular weight in g/mol (=atomic units)
M$_n$ number average of molecular weight (usually determined by GPC)
PP polypropylene
PE polyethylene
PE-LD low density polyethylene (LDPE)

Sterically Hindered Amines of the Hydrocarbyloxyamine or Hydroxyhydrocarbyloxyamine Class (Present Component c) for use in the Examples are the Compounds c1

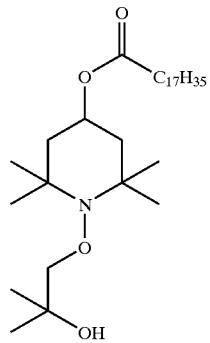

disclosed in example 73 of U.S. Pat. No. 6,271,377;

c2 mixture of compounds with main component of the formula

R$_1$NH—CH$_2$CH$_2$CH$_2$NR$_2$CH$_2$CH$_2$NR$_3$CH$_2$CH$_2$CH$_2$NHR$_4$ wherein 3 of $R_1$, $R_2$, $R_3$ and $R_4$ are residues of formula

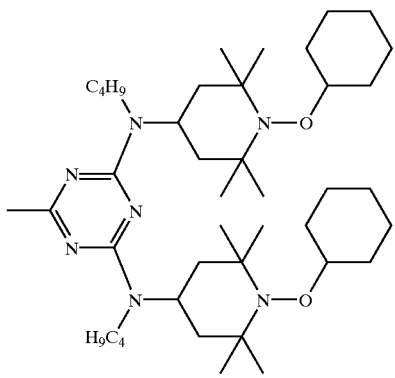

and 1 of $R_1$, $R_2$, $R_3$ and $R_4$ is hydrogen
(c2 is disclosed in example 3 of U.S. Pat. No. 5,844,026)

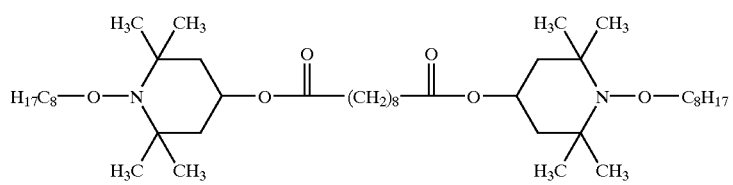

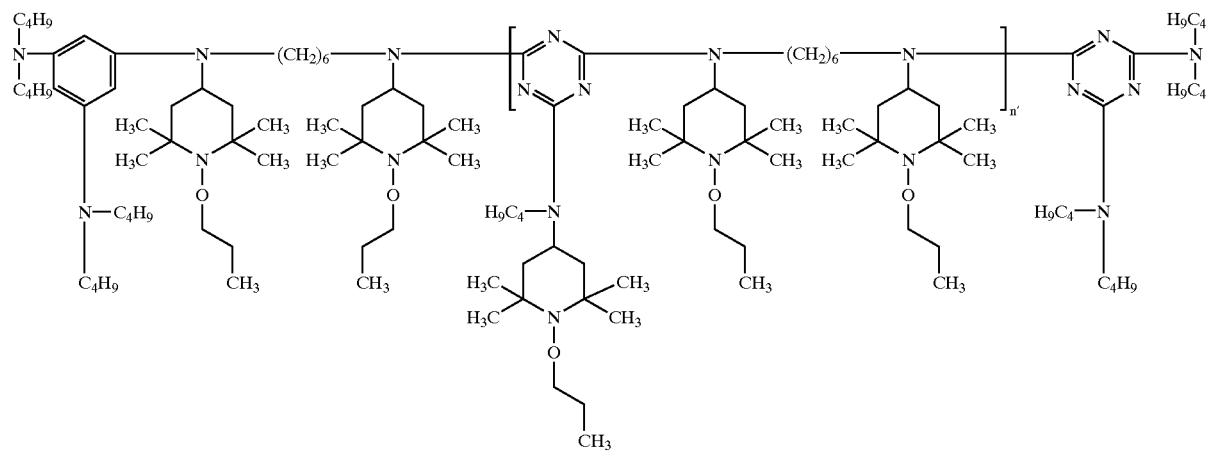

(example 2 of U.S. Pat. No. 6,117,995).

Further Stabilizers used in the Examples are Compounds of Formulae

A R—NH—$(CH_2)_3$—N(R)—$(CH_2)_2$—N(R)—$(CH_2)_3$—NH—R (CAS Registry No. 106990-43-6)

where R is the group

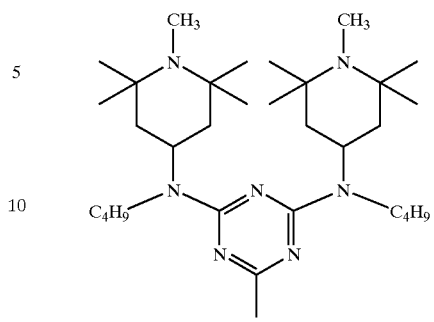

B poly [[6-[(1,1,3,3-tetramethyl butyl)amino]-1,3,5-triazine-2,4-diyl][[(2,2,6,6-tetramethyl-4-piperidyl)imino] hexamethylene [(2,2,6,6-tetramethyl-4-piperidyl)imino]](CAS-No. 70624-18-9)

C bis(2,2,6,6-tetramethylpiperidin-4-yl)-sebacate (CAS-No. 52829-07-9)

D oligomer (CAS-No. 65447-77-0) of the formula

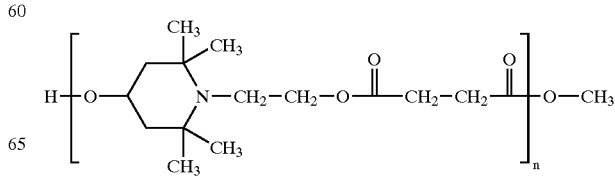

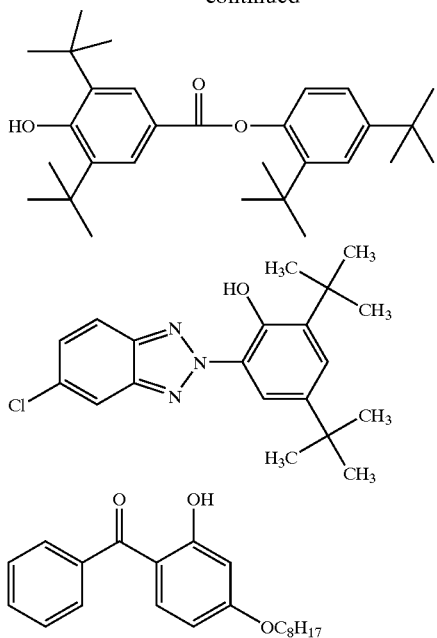

Compounds c2, c3 and A–G are commercial stabilizers available from Ciba Specialty Chemicals.

EXAMPLE 1

Sample preparation: Polymer powder and stabilizers are pre-mixed (Henschel mixer, 800 rpm, room temperature), pigment powder and flame retardant are added as concentrate in PP and homogenized in a drum mixer. Further homogenization and granulation is achieved by extrusion (Collin® twin screw extruder, max 200° C., 100 rpm).

Subsequently, the mixture is processed into a flat film by means of a single screw extruder (max 200° C., 70 rpm) equipped with a corresponding nozzle (sample dimension 2 mm thickness, 10 cm width).

Weathering: Punched samples are exposed to accelerated weathering (Atlas® WOM Ci 65, 0.35 W/m² (at 340 nm), 102 min dry, 18 min water spray, 63° C. black panel temperature. The effect of weathering on the surface is assessed in the following manner:

Visual inspection of chalking (chalking indicates decomposition on the surface).

Gloss: Minolta; degradation of surface reduces the reflection of polarized light (60° gloss as defined in DIN 67530).

$\Delta E$: Colour change (according to DIN 6174).

Formulation 84 parts by weight of polypropylene-ethylene copolymer (Novolen® PPG 1022), 15 parts by weight of a PE-based flame retardant masterbatch containing 51% by weight of ethylene-bis-tetrabromophthalimide (b4) and 17% by weight of $Sb_2O_3$, 1 part by weight of $TiO_2$ and 0.2 parts by weight of blue pigment (Cromophtal blue 4GNP)

and stabilizers as shown in the following table (amounts given in % by weight of the total formulation).

The results are shown in the following table.

TABLE

| Surface assessment after weathering for 2000 h | | | | |
|---|---|---|---|---|
| Exp. # | Stabilizers | Visual | Gloss | $\Delta E$ |
| a* | none | chalking | 3 | 5.9 |
| b | 0.3% c1<br>0.1% B<br>0.2% F | unchanged | 53 | 1.5 |
| c* | 0.3% C<br>0.1% B<br>0.2% F | chalking | 8 | 4.6 |
| d | 0.3% c1<br>0.1% B<br>0.2% E | unchanged | 51 | 2.8 |
| e* | 0.3% C<br>0.1% B<br>0.2% E | chalking | 8 | 5.9 |

*comparative example

Samples containing the combination of flame retardant and sterically hindered amine of present invention show no chalking, better gloss and distinctly less colour change than samples wherein present component c has been replaced by another sterically hindered amine.

EXAMPLE 2

Samples are prepared and subjected to accelerated weathering as described in example 1.

Formulation:

89 parts by weight of polypropylene-ethylene copolymer (Novolen® PPG 1022), 10 parts by weight of a PE based flame retardant masterbatch containing 30% by weight of tris-(2,3-dibromopropyl)-isocyanurate (b3) and 15% $Sb_2O_3$, 1 part by weight of $TiO_2$ and 0.2 parts by weight of blue pigment (Cromophtal blue 4GNP)

and stabilizers as shown in the following table (amounts given in % by weight of the total formulation). The results are shown in the following table.

TABLE

| Surface assessment after weathering for 2000 h | | | | |
|---|---|---|---|---|
| Exp. # | Stabilizers | Visual | Gloss | $\Delta E$ |
| a* | none | chalking | 8 | 7.5 |
| b | 0.3% c1<br>0.1% B<br>0.2% F | unchanged | 58 | 1.7 |
| c* | 0.3% C<br>0.1% B<br>0.2% F | chalking | 12 | 6.4 |
| d | 0.3% c3<br>0.1% B<br>0.2% E | unchanged | 57 | 3 |
| e | 0.3% c1<br>0.1% B<br>0.2% E | unchanged | 63 | 2.3 |
| f* | 0.3% C<br>0.1% B<br>0.2% E | chalking | 14 | 7.1 |

*comparative example

Replacing compound c3 in the above example by the same amount of c2 or c4 also leads to superior properties.

EXAMPLE 3

Sample preparation: Polymer powder, flame retardant and stabilizers are pre-mixed (Henschel mixer, 800 rpm, room temperature), pigment is added as concentrate in PE-LD and homogenized in a drum mixer. Further homogenization and granulation is achieved by extrusion (Berstorff® twin screw extruder (max 220° C., 100 rpm).

Test samples (44×68×2 mm) are obtained by compression moulding (Engel) at a plastification temperature of max 200° C. and a forming temperature of 50° C.

Accelerated weathering and assessment of the samples is done as described in example 1.

Formulation:
- 73 parts by weight of polypropylene-ethylene copolymer (Appryl ®3060),
- 25 parts by weight of melamine polyphosphate (flame retardant b1, Melapur®46),
- 2 parts by weight of blue pigment masterbatch (10% Cromophtal blue 4GNP in PE-LD)
- 0.15 parts by weight of a commercial phenolic antioxidant (1:1 mixture of tris(2,4-di-t-butylphenyl)phosphite and pentaerythritol tetrakis[3-(3,5-di-t-butyl-4-hydroxyphenyl)propionate], available from Ciba Specialty Chemicals)

and stabilizers as shown in the following table (amounts given in % by weight of the total formulation). The results are shown in the following table.

TABLE

| Surface assessment after weathering for 1000 h | | | | |
|---|---|---|---|---|
| Exp. # | Stabilizers | Visual | Gloss | Δ E |
| a* | 0.2% A 0.2% D | chalking | 5 | 23.9 |
| b | 0.133% A 0.266% c1 | unchanged | 19 | 3.9 |

*comparative example

EXAMPLE 4

Sample preparation, accelerated weathering and assessment of the samples is done as described in example 3.

Formulation:
- 82 parts by weight of polypropylene-ethylene copolymer (Appryl® 3060),
- 12 parts by weight of bis-(hexachlorocyclopentadieno) cyclooctane (flame retardant b2, Dechloran Plus®),
- 4 parts by weight of $Sb_2O_3$
- 2 parts by weight of blue pigment masterbatch (10% Cromophtal blue 4GNP in PE-LD)
- 0.15 parts by weight of a commercial phenolic antioxidant (1:1 mixture of tris(2,4-di-t-butylphenyl)phosphite and pentaerythritol tetrakis[3-(3,5-di-t-butyl-4-hydroxyphenyl)propionate], available from Ciba Specialty Chemicals)

and stabilizers as shown in the following table (amounts given in % by weight of the total formulation). The results are shown in the following table.

TABLE

| Surface assessment after weathering for 1000 h | | | | |
|---|---|---|---|---|
| Exp. # | Stabilizers | Visual | Gloss | Δ E |
| a* | 0.2% B 0.2% C | chalking | 7 | 5.1 |

TABLE-continued

| Surface assessment after weathering for 1000 h | | | | |
|---|---|---|---|---|
| Exp. # | Stabilizers | Visual | Gloss | Δ E |
| b | 0.2% A 0.2% c1 | unchanged | 35 | 0.7 |

*comparative example

EXAMPLE 5

Sample preparation, accelerated weathering and assessment of the samples is done as described in example 3. Formulation is identical with the one of example 3 except that the melamine polyphosphate flame retardant is replaced by the same amount of ammonium polyphosphate (flame retardant b1); Exolith® AP 752). Results are shown in the following table.

TABLE

| Surface assessment after weathering for 1500 h | | | | |
|---|---|---|---|---|
| Exp. # | Stabilizers | Visual | Gloss | Δ E |
| a* | 0.2% A 0.2% D | chalking | 5 | 21.4 |
| b | 0.2% A 0.2% c1 | unchanged | 28 | 3.1 |

*comparative example

EXAMPLE 6

Sample preparation, accelerated weathering and assessment of the samples is done as described in example 3.

Formulation:
- 92 parts by weight of polypropylene-ethylene copolymer (Appryl® 3060),
- 4 parts by weight of tris(3-bromo-2,2-(bromomethyl) propyl)phosphat (flame retardant, FR 372 from Dead See Bromine),
- 2 parts by weight of $Sb_2O_3$
- 2 parts by weight of blue pigment masterbatch (10% Cromophtal blue 4GNP in PE-LD)
- 0.15 parts by weight of a commercial phenolic antioxidant (1:1 mixture of tris(2,4-di-t-butylphenyl)phosphite and pentaerythritol tetrakis[3-(3,5-di-t-butyl-4-hydroxyphenyl)propionate], available from Ciba Specialty Chemicals)

and stabilizers as shown in the following table (amounts given in % by weight of the total formulation). The results are shown in the following table.

TABLE

| Surface assessment after weathering for 1500 h | | | | |
|---|---|---|---|---|
| Exp. # | Stabilizers | Visual | Gloss | Δ E |
| a* | 0.2% B 0.2% C | chalking | 6 | 7.6 |
| b | 0.2% A 0.2% c1 | unchalking | 56 | 0.4 |
| c | 0.4% c1 | unchalking | 56 | 0.3 |

*comparative example

EXAMPLE 7

Sample preparation, accelerated weathering and assessment of the samples is done as described in example 3.

Formulation:
- 88 parts by weight of polypropylene-ethylene copolymer (Appryl® 3060),
- 8 parts by weight of ethane-1,2-bis(pentabromophenyl) (flame retardant b6, Saytex® 8010),
- 4 parts by weight of Sb$_2$O$_3$
- 2 parts by weight of blue pigment masterbatch (10% Cromophtal blue 4GNP in PE-LD)
- 0.15 parts by weight of a commercial phenolic antioxidant (1:1 mixture of tris(2,4-di-t-butylphenyl)phosphite and pentaerythritol tetrakis[3-(3,5-di-t-butyl-4-hydroxyphenyl)propionate], available from Ciba Specialty Chemicals)

and stabilizers as shown in the following table (amounts given in % by weight of the total mulation). The results are shown in the following table.

TABLE

| | Surface assessment after weathering for 750 h | | | |
|---|---|---|---|---|
| Exp. # | Stabilizers | Visual | Gloss | Δ E |
| a* | 0.2% B<br>0.2% C<br>0.1% G | Chalking | 10 | 6.5 |
| b | 0.13% A<br>0.27% c1<br>0.1% G | Unchanged | 38 | 5.3 |

*comparative example

What is claimed is:

1. A flame retardant and light stabilized composition comprising
   (a) a polyolefin,
   (b) tris-(2,3-dibromopropyl)-isocyanurate as a flame retardant and
   (c) a hydrocarbyloxyamine or hydroxyhydrocarbyloxyamine sterically hindered amine light stabilizer.

2. A flame retardant composition stabilized against deleterious effects of light and weathering comprising
   (a) a thermoplastic polymer,
   (b) a flame retardant selected from the group consisting of ammonium polyphoshate, halogenated and melamine based flame retardants and
   (c) a combination of sterically hindered amine light stabilizers comprising
      c1) a low molecular weight hydroxyhydrocarbyloxyamine sterically hindered amine, and
      c2) a high molecular weight secondary or alkylated or polymeric tertiary sterically hindered amine,
      wherein c1) is from the molecular weight range 200 to 1000 g/mol and c2) is from the molecular weight range 1200 to 10000 g/mol.

3. Composition according to claim 2, wherein component (a) is a polyolefin.

4. A flame retardant composition stabilized against deleterious effects of light and weathering comprising
   (a) a polyolefin,
   (b) a flame retardant selected from the group consisting of ammonium polyphosphate, halogenated and melamine based flame retardants and
   (c) a combination of sterically hindered amine light stabilizers comprising, on 100 parts by weight of total component (c),
      c1) 40 to 95 parts by weight of a low molecular weight hydroxyhydrocarbyloxyamine or hydrocarbyloxyamine sterically hindered amine and
      c2) 5 to 60 parts by weight of a high molecular weight secondary or alkylated tertiary sterically hindered amine,
      wherein c1) is from the molecular weight range 200 to 1000 g/mol and c2) is from the molecular weight range 1200 to 10000 g/mol and
      when the polyolefin (a) is polypropylene, c1) is 60 to 85 parts by weight on 100 parts by weight of total component (c).

5. Composition according to claim 2, wherein component (b) is a flame retardant selected from the group consisting of
   b1) melamine based flame retardants and/or ammonium polyphosphate,
   b2) bis-(hexachlorocyclopentadieno) cyclooctane,
   b3) tris-(2,3-dibromopropyl)-isocyanurate,
   b4) ethylene-bis-tetrabromophthalimide,
   b5) 1,2,5,6,9,10-hexabromo-cyclo-dodecane,
   b6) 1,2-bis(pentabromophenyl)ethane and
   b7) tris(3-bromo-2,2-(bromomethyl)propyl) phosphate.

6. Composition according to claim 4, wherein component (b) is a flame retardant selected from the group consisting of
   b1) melamine based flame retardants and/or ammonium polyphosphate,
   b2) bis-(hexachlorocyclopentadieno) cyclooctane,
   b3) tris-(2,3-dibromopropyl)-isocyanurate,
   b4) ethylene-bis-tetrabromophthalimide,
   b5) 1,2,5,6,9,10-hexabromo-cyclo-dodecane,
   b6) 1,2-bis(pentabromophenyl)ethane and
   b7) tris(3-bromo-2,2-(bromomethyl)propyl) phosphate.

7. Composition according to claim 1 containing component (b) in an amount from 0.5 to 50% by weight, and component (c) in an amount of 0.01 to 10% by weight, each based on the weight of component (a).

8. Composition according to claim 2 containing component (b) in an amount from 0.5 to 50% by weight, and component (c) in an amount of 0.01 to 10% by weight, each based on the weight of component (a).

9. Composition according to claim 4 containing component (b) in an amount from 0.5 to 50% by weight, and component (c) in an amount of 0.01 to 10% by weight, each based on the weight of component (a).

10. Composition according to claim 1 additionally containing one or more further components selected from the group consisting of pigments, dyes, plasticizers, antioxidants, thixotropic agents, levelling assistants, basic costabilizers, metal passivators, metal oxides, organophosphorus compounds, hydroxylamines, further light stabilizers and mixtures thereof.

11. Composition according to claim 2 additionally containing one or more further components selected from the group consisting of pigments, dyes, plasticizers, antioxidants, thixotropic agents, levelling assistants, basic costabilizers, metal passivators, metal oxides, organophosphorus compounds, hydroxylamines, further light stabilizers and mixtures thereof.

12. Composition according to claim 4 additionally containing one or more further components selected from the group consisting of pigments, dyes, plasticizers, antioxidants, thixotropic agents, levelling assistants, basic costabilizers, metal passivators, metal oxides, organophosphorus compounds, hydroxylamines, further light stabilizers and mixtures thereof.

13. Composition according to claim 1 additionally containing one or more further components selected from the group consisting of pigments, phenolic antioxidants, calcium stearate, zinc stearate, sterically hindered amines and 2-hydroxy-benzophenone, 2-(2'-hydroxyphenyl) benzotriazole or 2-(2-hydroxyphenyl)-1,3,5-triazine UV absorbers.

14. Composition according to claim 2 additionally containing one or more further components selected from the group consisting of pigments, phenolic antioxidants, calcium stearate, zinc stearate, sterically hindered amines and 2-hydroxy-benzophenone, 2-(2'-hydroxyphenyl) benzotriazole or 2-(2-hydroxyphenyl)-1,3,5-triazine UV absorbers.

15. Composition according to claim 4 additionally containing one or more further components selected from the group consisting of pigments, phenolic antioxidants, calcium stearate, zinc stearate, sterically hindered amines and 2-hydroxy-benzophenone, 2-(2'-hydroxyphenyl) benzotriazole or 2-(2-hydroxyphenyl)-1,3,5-triazine UV absorbers.

16. Molded or extruded article comprising a composition according to claim 1.

17. Molded or extruded article comprising a composition according to claim 2.

18. Molded or extruded article comprising a composition according to claim 4.

* * * * *